(12) United States Patent
Bizet

(10) Patent No.: US 7,526,789 B2
(45) Date of Patent: Apr. 28, 2009

(54) SYSTEM FOR THE TRANSMISSION OF AUDIOVISUAL SIGNALS BETWEEN SOURCE NODES AND DESTINATION NODES

(75) Inventor: Stephane Bizet, Rennes (FR)

(73) Assignee: Canon Europa NV, Amstelveen (NL)

( * ) Notice: Subject to any disclaimer, the term of this patent is extended or adjusted under 35 U.S.C. 154(b) by 1278 days.

(21) Appl. No.: 10/359,639

(22) Filed: Feb. 7, 2003

(65) Prior Publication Data
US 2003/0221195 A1 Nov. 27, 2003

(30) Foreign Application Priority Data
Feb. 11, 2002 (FR) .................... 02 1665

(51) Int. Cl.
H04N 7/173 (2006.01)
H04N 7/16 (2006.01)
H04N 7/18 (2006.01)
G06F 9/00 (2006.01)
H04L 9/32 (2006.01)

(52) U.S. Cl. .................... 725/119; 725/25; 725/78; 726/12; 726/29

(58) Field of Classification Search .................. 725/135, 725/74, 78, 82, 85, 119, 149, 12, 27, 29
See application file for complete search history.

(56) References Cited

U.S. PATENT DOCUMENTS

| | | | | |
|---|---|---|---|---|
| 5,799,081 A * | 8/1998 | Kim et al. | .................... | 380/203 |
| 6,055,315 A * | 4/2000 | Doyle et al. | ................. | 380/242 |
| 6,700,989 B1 * | 3/2004 | Itoh et al. | .................... | 382/100 |
| 6,742,188 B1 * | 5/2004 | Del Castillo | ................. | 725/153 |
| 6,745,392 B1 * | 6/2004 | Basawapatna et al. | ...... | 725/120 |
| 7,027,460 B2 * | 4/2006 | Iyer et al. | .................... | 370/429 |

(Continued)

FOREIGN PATENT DOCUMENTS

EP 0 715 246 A1 6/1996

OTHER PUBLICATIONS

"Havi Introduction" (found at http://www.ict.tuwien.ac.at/ieee1394/havi/havi_intro-en.htm) 2001.

(Continued)

*Primary Examiner*—John W Miller
*Assistant Examiner*—Chris Parry
(74) *Attorney, Agent, or Firm*—Fitzpatrick, Cella, Harper & Scinto

(57) ABSTRACT

A system for the transmission of audiovisual signals between at least one source node and at least one destination node comprises: at least one central switch to which at least one source node is connected and at least two home audiovisual networks, each comprising a plurality of nodes each capable of playing the role of a destination node to which said audiovisual signals are transmitted from said at least one source node. Each home audiovisual network is connected to said at least one central switch by means of said at least one of its nodes. Said at least one central switch comprises interconnection management means. These means themselves comprise means for the selective authorisation of a first type of transmission of audiovisual signals through said at least one central switch from said at least one source node to at least one of the destination nodes of one of the home audiovisual networks.

23 Claims, 14 Drawing Sheets

U.S. PATENT DOCUMENTS

2002/0059621 A1* 5/2002 Thomas et al. ............. 725/87

OTHER PUBLICATIONS

R. Gallagher et al., "Broadcasting Routing Information: Coping With Link Failures", second edition, in *Data Networks*, Prentice Hall, 1992, pp. 418-433.

"Digital Transmission Content Protection Specification," v. 1, Rev. 1.1, Hitachi, Intel, Matsushita, Sony, Toshiba, Jul. 25, 2000.

* cited by examiner

| Node | P0 | P1 | P2 | P3 | P4 | P5 | P6 | P7 | P8 | P9 | P10 | P11 | P12 | P13 | P14 |
|---|---|---|---|---|---|---|---|---|---|---|---|---|---|---|---|
| CS | | | AU1,2 | AU3,2 | AU2,0 | | | | | | | | TU2,0 | | TU1,0 |
| TU1 | CS,14 | | | | | | | | | | | | | | |
| TU2 | CS,12 | | | | | | | | | | | | | | |
| AU1 | MU1,0 | | CS,2 | | | | | | | | | | | | |
| AU2 | CS,4 | MU5,0 | MU7,0 | | | | | | | | | | | | |
| AU3 | MU3,0 | | CS,3 | | | | | | | | | | | | |
| MU1 | AU1,0 | MU2,0 | | | | | | | | | | | | | |
| MU2 | MU1,1 | | | | | | | | | | | | | | |
| MU3 | AU3,0 | MU4,0 | MU8,0 | | | | | | | | | | | | |
| MU4 | MU3,1 | MU8,1 | | | | | | | | | | | | | |
| MU5 | AU2,1 | MU6,1 | MU6,0 | | | | | | | | | | | | |
| MU6 | MU5,2 | MU5,1 | | | | | | | | | | | | | |
| MU7 | AU2,2 | | | | | | | | | | | | | | |
| MU8 | MU3,2 | MU4,1 | | | | | | | | | | | | | |

Fig. 6

| Node | P0 | P1 | P2 | P3 | P4 | P5 | P6 | P7 | P8 | P9 | P10 | P11 | P12 | P13 | P14 |
|---|---|---|---|---|---|---|---|---|---|---|---|---|---|---|---|
| CS |  |  | AU1,2 | AU3,2 | AU2,0 |  |  |  |  |  |  |  | TU2,0 |  | TU1,0 |
| TU1 | CS,14 |  |  |  |  |  |  |  |  |  |  |  |  |  |  |
| TU2 | CS,12 |  |  |  |  |  |  |  |  |  |  |  |  |  |  |
| AU1 | MU1,0 |  | CS,2 |  |  |  |  |  |  |  |  |  |  |  |  |
| AU2 | CS,4 | MU5,0 | MU7,0 |  |  |  |  |  |  |  |  |  |  |  |  |
| AU3 | MU3,0 |  | CS,3 |  |  |  |  |  |  |  |  |  |  |  |  |
| MU1 | AU1,0 | MU2,0 |  |  |  |  |  |  |  |  |  |  |  |  |  |
| MU2 | MU1,1 | MU7,1 |  |  |  |  |  |  |  |  |  |  |  |  |  |
| MU3 | AU3,0 | MU4,0 | MU8,0 |  |  |  |  |  |  |  |  |  |  |  |  |
| MU4 | MU3,1 | MU8,1 |  |  |  |  |  |  |  |  |  |  |  |  |  |
| MU5 | AU2,1 | MU6,1 | MU6,0 |  |  |  |  |  |  |  |  |  |  |  |  |
| MU6 | MU5,2 | MU5,1 |  |  |  |  |  |  |  |  |  |  |  |  |  |
| MU7 | AU2,2 | MU2,1 |  |  |  |  |  |  |  |  |  |  |  |  |  |
| MU8 | MU3,2 | MU4,1 |  |  |  |  |  |  |  |  |  |  |  |  |  |

Fig. 8

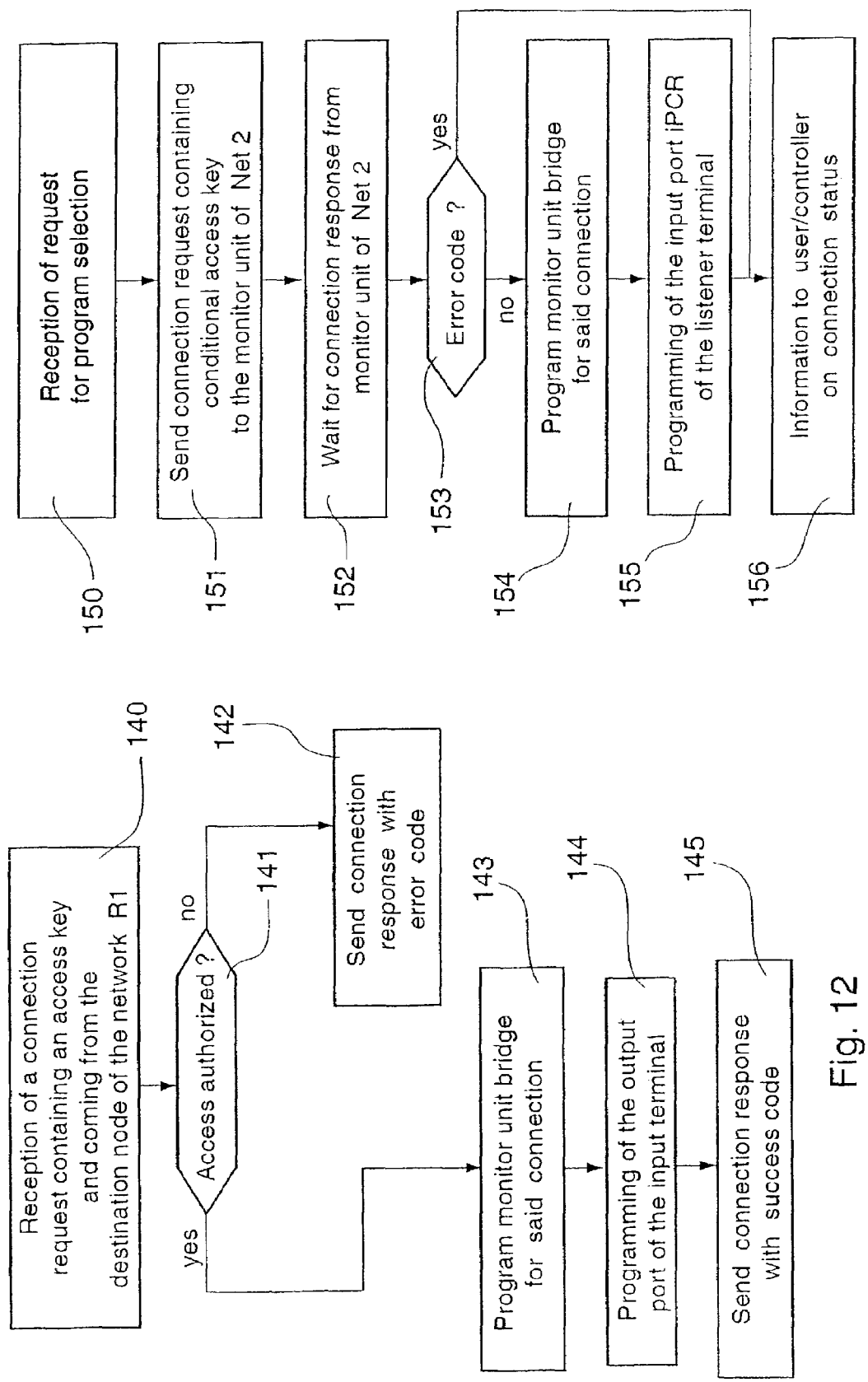

SYSTEM FOR THE TRANSMISSION OF AUDIOVISUAL SIGNALS BETWEEN SOURCE NODES AND DESTINATION NODES

BACKGROUND OF THE INVENTION

1. Field of the Invention

The field of the invention is that of home audiovisual networks of the type used to interconnect a plurality of audio and/or video analog and/or digital type terminals (also called devices) so that they exchange audiovisual signals.

These terminals belong, for example, to the following list of equipment (which is not exhaustive): television receivers (using satellite, RF channels, cable, xDSL and other means), television sets, video tape recorders, scanners, digital video cameras, digital cameras, DVD readers, computers, personal digital assistants (PDAs), printers, etc.

The home audiovisual networks are, for example, of the high-bit-rate switched type comprising a small number of nodes, used especially for the real-time exchange of moving pictures for distribution within a dwelling.

The home audiovisual networks according to the invention comprise a plurality of nodes connected by a plurality of physical communication links. These links are for example of the type used for two-way data transfers according to the IEEE 1355 standard.

Audio and/or video terminals communicate with one another through the nodes to which they are connected. The nodes that form the skeleton of the network comprise especially:

first interface means enabling the connection, through one or more links (for example according to the IEEE 1355 standard), of one or more other nodes;

second interface means used for the connection of one or more analog terminals (namely terminals capable of receiving audiovisual signals in analog form);

third interface means used for the connection (for example through a digital bus according to the IEEE 1394 standard) of one or more digital terminals (namely terminals capable of receiving audiovisual signals in digital form).

A home audiovisual network of this kind works as follows: a connection is set up, through a plurality of nodes, between a first terminal (or listener) that seeks to receive audiovisual signals and a second terminal (or talker) that can give it these signals.

Some elements of the terminology used hereinafter in the description shall now be specified.

The first terminal mentioned here above, namely the listener, is called a "destination terminal" and the node to which it is connected is called a "destination node" or "display unit".

In the case of the second terminal mentioned here above, two cases may be distinguished.

In a first case, this second terminal is integrated into a node called a "source node". Thus, it is assumed that the source node comprises means for the reception and/or reading of source signals (originating outside the network) and means for the transmission of these source signals, in the form of the above-mentioned audiovisual signals, to the destination node. In other words, the source node receives and/or reads source signals and introduces them into the home audiovisual network in the form of audiovisual signals. In this first case, the (source) node and the second terminal are one and the same.

The present invention can be applied preferably to the case where the source node includes a television receiver (for example in France a "TPS" (registered mark) receiver or "Canal Satellite" (registered mark) receiver). In this case, the source node is also called a "Tuner Unit". It enables the direct introduction into the network, in digital form (generally encoded in the MPEG2 format) of source signals given by an operator and containing television programs.

In a second case, the second terminal called an "input terminal" is connected to a node called an "input node". Unlike the first case, the (input) node and the second terminal are not one and the same. The input node does not have means for the reception and/or reading of source signals (originating outside the network). The input node receives audiovisual signals coming from the input terminal and introduces them into the home audiovisual network.

The term "input terminal" is understood to mean for example a camcorder, a digital camera, a digital output DVD reader or any analog device seen through an analog/digital converter.

More specifically, the invention relates a system for the transmission of audiovisual signals comprising several home audiovisual networks as mentioned here above.

The invention has many applications such as, for example, a system for the transmission of audiovisual signals within a building, where each household possesses (at least) one home audiovisual network (which is a private network).

Such a system must enable the sharing of at least one source node (for example a "tuner unit") by the plurality of home audiovisual networks while, at the same time, complying with the rights of access to the audiovisual signals transmitted by the source node. In other words, each destination or listener terminal should be capable, provided that the user has the necessary authorization, of receiving audiovisual signals transmitted by the source node (through the destination node to which it is connected). Typically, the authorization consists of a subscription by the user with an operator (for example a television provider).

Such a system must also enable exchanges of audiovisual signals between home audiovisual networks. In other words, each listener or destination terminal of a home audiovisual network should be capable of receiving audiovisual signals (through the destination node to which it is connected), audiovisual signals transmitted by an input node (which must not be mistaken for a source node as explained here above).

Here below in the description, the term "pay-contents" is used to describe the audiovisual signals transmitted by a source node (for example a "tuner unit"). Furthermore, the term "user-contents" is used to describe the audiovisual signals transmitted by an input node (which receives audiovisual signals coming from an input terminal, for example a digital camera).

To date, there is no known system having these characteristics (namely source nodes shared by a plurality of home audiovisual networks and exchanges of audiovisual signals between home audiovisual networks).

A system of this kind must also enable the control of the reproduction (copying) and/or the broadcasting of audiovisual signals introduced by the source node or nodes shared by the plurality of home audiovisual networks.

It will be understood, for example, that an operator who supplies source signals containing television programs to a source node would want some (or even all) these programs to be incapable of being copied (i.e. pirated) by a user of the network who has a terminal, in this network, fitted out with means for recording on a data medium.

2. Description of the Prior Art

In a first known mechanism for the protection of audiovisual signals when they are digital type signals, a DTCP format encoding is applied to these signals (see detailed explanation here below with reference to the figures). This first known protection mechanism assumes the presence of DTCP format encoding means at one end and corresponding decoding means at the other end. Now DTCP format encoding or decoding means are very costly at present. It is therefore not possible to consider equipping each node of the network with such means.

In a second known protection means, audiovisual signals, when they are analog type signals, are partially scrambled in order to prevent them from being copied. An anti-copy scrambling of this kind is done for example according to the "Macrovision" (registered mark) standard (see detailed explanation here below with reference to the figures). This second known protection mechanism cannot, at present, be implemented and activated systematically in all the destination nodes of the home audiovisual network to which analog terminals are connected. Indeed, the user should be left with the possibility of copying certain audiovisual signals which are not subjected to any special protection. For example, he is allowed to make a video tape recording of a program broadcast on a public television station.

It can be seen therefore that the two known protection mechanisms described here above (DCTP and "Macrovision") cannot be used alone or in combination to provide optimum protection to audiovisual signals at an acceptable cost.

SUMMARY OF THE INVENTION

It is a goal of the invention to overcome these various drawbacks of the prior art.

More specifically, one of the goals of the present invention is to provide a system for the transmission of audiovisual signals enabling the sharing of one or more source nodes by a plurality of home audiovisual networks while complying with the rights of access to the audiovisual signals transmitted by the source node or nodes.

It is also a goal of the invention to provide a system of this kind furthermore enabling exchanges of audiovisual signals among home audiovisual networks sharing the source node or nodes.

It is an additional goal of the invention to provide a system of this kind with a topology that can be modified easily and inexpensively by the elimination or addition of nodes (source nodes, input nodes, destination nodes etc). In other words, the system has to be flexible and have dimensional variability (namely it must have "scalability").

It is also a goal of the invention to provide a system of this kind to control the reproduction or copying of audiovisual signals introduced by the source node or nodes that the home audiovisual networks share with each other.

It is another goal of the invention to provide a system of this kind that does not require the implementation of a DTCP format decoding module in each node of the home audiovisual networks.

Yet another goal of the invention is to provide a system of this kind further enabling the control of the broadcasting of audiovisual signals introduced by the shared source node or nodes.

Yet another goal of the invention to provide a system of this kind, making it possible to benefit from the advantages related to anti-copy scrambling (for example according to the "Macrovision" standard), namely authorising broadcasting (for example on a television receiver) while prohibiting copying (for example on a video tape recorder).

Yet another goal of the invention is to provide a system of this kind by which the protection of certain audiovisual signals can be made to coexist with the absence of protection of certain other audiovisual signals. These different goals as well as others that shall appear here below are achieved according to the invention by means of a system for the transmission of audiovisual signals between at least one source node and at least one destination node, the system comprising at least a central switch, connected to a source node at least a home audiovisual network comprising a destination node, each home audiovisual network being connected to the central switch by means of at least an access node wherein the central switch comprises interconnection management unit for managing the exchange of audiovisual signals, the interconnection management unit comprises selective authorization means for selectively authorizing the transmission of audiovisual signals from the source node to the destination node through the central switch and the access node.

The general principle of the invention therefore consists of the use of at least one central switch to obtain the sharing of at least one source node by a plurality of home audiovisual networks. Said at least one central switch furthermore ensures compliance with the rights of access to the audiovisual signals transmitted by the source node or nodes. This second function is obtained for example by a mechanism for the verification of access keys given by the destination nodes (directly or through the access units) wishing to receive audiovisual signals transmitted by a source node.

Furthermore, the entire system according to the present invention may be seen as a total audiovisual network. The central switch is a novel type of node, it allows easy and low-costs modification of the system, by removing or adding source nodes and home audiovisual networks. The topology of each home audiovisual network can also be modified easily and at low-cost by the addition or elimination of nodes (forming destination nodes).

Advantageously, the interconnection management unit comprises automatic authorisation means for automatically authorising the transmission of audiovisual signals from a node of a first home audiovisual network, called input node, to a destination node of a second home audiovisual network, through the central switch.

Thus, said at least one central switch also enables exchanges of audiovisual signals between the home audiovisual networks which furthermore share one or more source nodes with each other.

In other words, within the total audiovisual network formed by the system according to the invention, said at least one central switch enables:

under control, "pay-content" exchanges from a source node to a destination node, without control, "user-content" exchanges from a first to a second destination node, belonging to two distinct home audiovisual networks.

Advantageously, the interconnection management unit comprises prohibition means for systematically prohibiting the transmission of audiovisual signals from any node of the home audiovisual network to a source node, through the central switch.

Preferably, each home audiovisual network is connected to the central switch by means of a single access node.

In a particular embodiment of the invention, each destination node comprises:

obtaining means for obtaining an access key transmission means for transmitting a connection request to the interconnection management means, for the reception of audiovisual signals from a source node, the connection request containing said access key.

As indicated here above, this mechanism for the verification of access keys enables said at least one central switch to ensure compliance with access rights to the audiovisual signals transmitted by the source node or nodes. It will be noted that, in this particular embodiment, the access key is known to the destination node which attaches it to its connection request.

According to an advantageous alternative embodiment, each destination node comprises:
transmission means for transmitting a connection request to the access node, for the reception of audiovisual signals from a source node, and the access node comprises:
reception means for receiving a connection request from a destination node
obtaining means for obtaining an access key
transmission means for transmitting the connection request to the interconnection management means, the connection request containing said access key and an identifier of the destination node This variant can be distinguished from the above-mentioned embodiment by the fact that the access key is not known to the destination node but to the access unit. This access unit attaches the access key to the connection request that is transmitted by the destination node and travels through it (before reaching said at least one central switch).

It is possible, as the case may be, to make this variant coexist with the particular embodiment mentioned here above.

Each access key is, for example, specific to a given destination node of a given home audiovisual network. It can also be dedicated to a given home audiovisual network and is therefore shared, in this case, by all the destination nodes of this home audiovisual network.

Advantageously, the interconnection management means comprises:
reception means for receiving connection request for the transmission of audiovisual signals from a source node to a destination node, the connection request containing at least a access key
checking means for checking the access key contained in the connection request,
and the selective authorisation means authorizes the transmission of audiovisual signals from source node to the destination node according to the access key.

Preferably, each central switch comprises detection means for detecting a direct junction between two audiovisual networks, which does not go through the central switch, the selective authorization means prohibiting the transmission of audiovisual signals from a source node to a destination node, included in a home audiovisual network implicated in a direct junction.

In this way, unauthorised exchanges between home audiovisual networks are prohibited. Indeed, the following possible fraudulent scenario is prevented: a destination node that has obtained permission (through the central switching node) to receive audiovisual signals transmitted by a source node retransmits these audiovisual signals to one or more other destination nodes of another home audiovisual network. In other words, it is seen to it that a given authorisation by the central switching node does not extend beyond the network in which the destination node having obtained this authorisation is located.

In a basic embodiment of the invention, each central switch comprises a first set of input/output ports for connecting source nodes and a second set of input/output port for connecting access nodes.

The working of the central switch in this case depends on the pre-determined allocations of the input/output ports distributed into two sets as specified here above.

According to a first advantageous variant, the interconnection management means comprises means for managing an administration interface, through which a system administrator can allocate switching parameters, which define authorized paths between the first and second set of ports of the central switch.

Contrary to the above-mentioned basic embodiment, the input/output ports do not have any pre-determined allocation or assignment. It is the administrator that defines the paths authorised within the central switching node and programs a corresponding arbitration matrix.

According to a second advantageous variant, the interconnection management means comprise identification means for dynamically identifying the nodes connected to the central switch and allocating means for automatically defining the switching parameters of the central switch.

Just as in the first variant, the input/output ports do not have any pre-determined assignments. By contrast, automatically (without any intervention by the administrator) the central switch detects and identifies the nodes that are connected to it so as to define an arbitration matrix.

Preferably, the home audiovisual network is a switched type network.

In an advantageous embodiment of the invention, the source node and or the central switch comprise insertion means for inserting, into an audiovisual signal to be sent from the source node to the destination node, control information for the control, by the destination node, of the copying and/or broadcasting of the audiovisual signal.

In other words, an additional operation is performed in the source node and/or in the central switch (an operation for the association of a piece of control information with the audiovisual signals) so that the destination node knows that it must perform an operation related to the copying and/or the broadcasting of the audiovisual signals that it receives from the source node.

Preferably, the control information comprises a first information element for specifying whether the destination node is or is not allowed to authorize a destination terminal, connected to the destination node, to copy the audiovisual signals.

In other words, the source node and/or the central switch decide on the treatment that the destination node must apply to an audiovisual signal that it receives from the source node. On this processing operation will depend the ability or inability of a destination terminal or listener, connected to this destination node, to copy the above-mentioned audiovisual signal.

Advantageously, the first information element is encoded on one bit.

Advantageously, anti-copying means of the monitor input is activated or deactivated, depending on a value of the first information element and, the anti-copying means acts on the audiovisual signal to enable the audiovisual signal to be viewed but not recorded.

In a particular embodiment of the invention, the anti-copying means performs a scrambling operation according to a Macrovision standard.

Preferably, the control information further comprises a second information element specifying whether the audiovisual signal is intended for a particular destination terminal, connected to the destination node, and/or for a particular user, or whether the audiovisual signal is authorized to be transmitted to any destination terminal connected to the destination node.

As in the case of the first information element described here above, the source node and/or the central switch decide on the processing that the destination node must apply to an audiovisual signal that it receives from the source node. On this processing operation will depend the ability or inability of a destination terminal or listener connected to this destination node to copy the above-mentioned audiovisual signal.

Advantageously, the second information element is encoded on one bit.

Preferably, the destination node comprises a control means for controlling when the second information element specifies that the audiovisual signal is intended for the particular destination terminal, connected to the destination node, and/or for the particular user.

In other words, the destination node sees to it that the destination terminal or listener and/or the particular user is (or are) effectively authorised to receive the audiovisual signal coming from the source node.

Preferably, the control means comprises a detection means for detecting a local key, known to the destination node and/or introduced by the particular user.

The processing of the local key may be done by the destination node (which for example compares this local key with a reference key, stored in its protected memory) or by any other piece of equipment of the network (for example the source node or the central switch).

In a preferred embodiment of the invention, said piece of control information comprises said first information element and said second information element.

In other words, the first and second embodiments mentioned here above are combined together, thus enabling different levels of protection to be associated with the destination terminals or listeners.

The invention also relates to an audiovisual signal transmitted from a source node to a destination node through at least one central switch of a system as the one mentioned here above. The signal comprises control information for the control by the destination node of the copying and/or broadcasting of the audiovisual signal.

The invention also relates to a central switch, a destination node and an access node.

BRIEF DESCRIPTION OF THE DRAWINGS

Other features and advantages of the invention shall appear from the following description of a preferred embodiment of the invention, given by way of a simple, illustrative and non-restrictive example, and from the appended drawings, of which:

The present invention therefore relates to a system for the transmission of audiovisual signals between at least one source node and one destination node.

FIG. 6 illustrates a topological map of the system of FIG. 1, forming a total switched network.

FIG. 8 illustrates a topological map of the system of FIG. 1, forming a total switched network, and including the junction illustrated in FIG. 7;

FIG. 10) being executed by the central switch, and the other (cf. FIG. 11) by the destination node;

FIGS. 12 and 13 are two flowcharts each describing an algorithm relating to the delivery of "user contents", one (cf. FIG. 12) being executed by the input node, and the other (cf. FIG. 13) by the destination node;

MORE DETAILED DESCRIPTION

Figure 1:
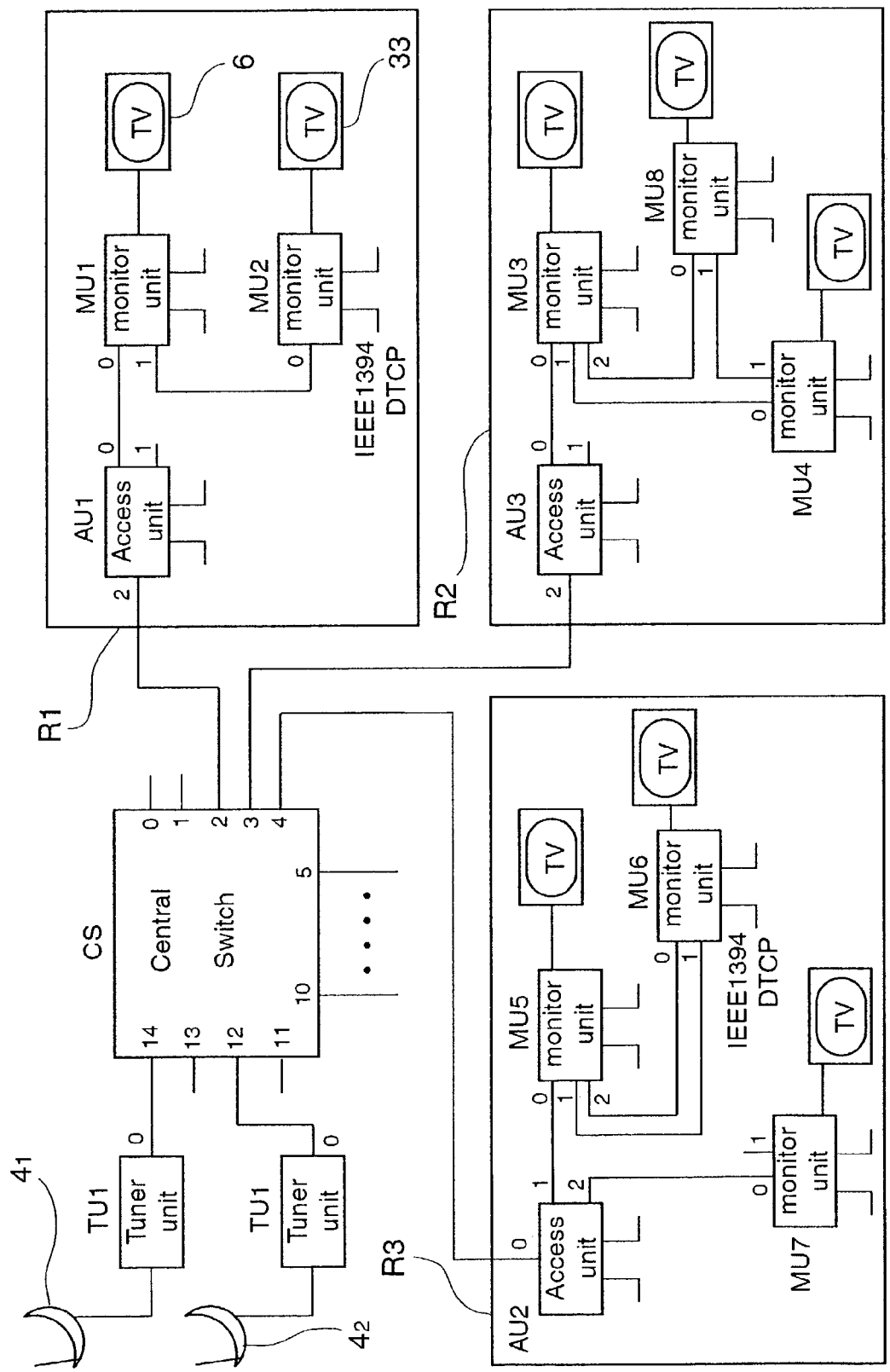
FIG. 1 is a block diagram of an exemplary system according to the present invention.

Referring to the block diagram of FIG. 1, we now present an exemplary system according to the present invention comprising:

one or more source nodes or tuner units;
one or more central switches;
several home audiovisual networks.

The source nodes are shared by the home audiovisual networks. The central switches act as intermediaries between the source node or nodes and the home audiovisual networks. Each home audiovisual network which corresponds, for example, to a household in a building comprises a plurality of the monitor units used to interconnect a plurality of audiovisual terminals. Each of these monitor units can act as a destination node to which the audiovisual signals are transmitted from one of the source nodes. Each home audiovisual network is connected to the central switch by means of a particular node known as an access unit.

The wiring between the central switches, the source nodes and the access units are not accessible to the end user. There is no direct connection between a source node and an access unit but only connections to a central switch. The entire system forms a total switched network, assuming that the home audiovisual networks are themselves of the switched type.

As explained in detail here below, the system according to the invention enables the selective delivery of pay contents to authorized users alone (for example those who have taken out subscriptions with a contents provider). The system according to the invention also provides for the free exchange of user contents among nodes of different home audiovisual networks.

The exchange of user contents between nodes of one home audiovisual network, which is also free, is not the object of the present invention and shall therefore not be discussed herein.

Each node contained in one of the home audiovisual networks is for example equipped with:

a first IEEE 1355 type (input/output) interface used to connect this node to other nodes;

a second IEEE 1394 type (input/output) interface used to connect this node to a digital bus to which it is possible to connect digital terminals or, through analog/digital converters, analog terminals;

a third analog type (output only) interface used to connect this node to an analog terminal;

a fourth infrared type (input) interface used to send commands from a remote control pack (not shown) to the node in the context of a man/machine interface between a user and the node.

In the example of FIG. 1, the system comprises:

a central switch CS;

two source nodes or tuner units TU1, TU2, each including a television satellite receiver whose respective antennas are referenced $4_1$ and $4_2$. Each tuner unit TU1, TU2 is connected to the central switch CS, through an IEEE 1355 type link;

three home audiovisual networks R1, R2, R3.

The first home audiovisual network R1 comprises:

an access unit AU1, connected to the central switch CS and to a destination node referenced MU1, through IEEE 1355 type links.

a destination node referenced MU1, connected to the access unit AU1 and to a destination node referenced MU2, through IEEE 1355 type links. A television set 6 is connected to its analog interface. Although this is not the case in FIG. 1 (for the sake of simplification), an IEEE 1394 type bus could be connected to its corresponding interface, and terminals could be connected to this bus, for example a video tape recorder and a reader DVD, each through an analog/digital converter;

a destination node referenced MU2, connected to the access unit AU1 through an IEEE 1355 type link. A television set 33 is connected to its analog interface. Although this is not the case in FIG. 1 (for the sake of simplification), an IEEE 1394 type bus could be connected to its corresponding interface, and a terminal could be connected to this bus, for example a camcorder (registered mark) through an analog/digital converter. It is clear that if the camcorder has a digital output, it could be directly connected to the IEEE 1394 type bus.

The second home audiovisual network R2 comprises an access unit AU3 and three other nodes referenced MU3, MU4 and MU8 respectively, whose interconnections through IEEE 1355 type links are illustrated in FIG. 1 (they shall not be described here in detail).

The third home audiovisual network R3 comprises an access unit AU2 and three other destination nodes referenced MU5, MU6 and MU8 respectively, whose interconnections through IEEE 1355 type links are illustrated in FIG. 1 (they shall not be described here in detail)

By way of an illustration, the following cases are considered here below in the description:

first case: a user of the first home audiovisual network wishes to receive a satellite television program on the television set referenced 6, connected to the destination node referenced MU1, this satellite television program being received by the source node referenced TU1 ("talker"). In this first case, the television set referenced 6 constitutes a destination terminal or listener and the node referenced MU1 is a destination node;

second case: a user of the first home audiovisual network wishes to receive audiovisual signals generated by a camcorder (not shown) on the television set referenced 6, this camcorder being connected to the destination node referenced MU3 of the second home audiovisual network R2. As in the first case, the television set referenced 6 constitutes a destination terminal or listener and the node referenced MU1 is a destination node. Furthermore, the camcorder is an input terminal (talker) and the node referenced MU3 is an input node.

Here below, with reference to FIG. 2, we shall present an exemplary structure of a source node or tuner unit TU1, TU2 belonging to a system according to the invention.

It may be recalled that a source node of this kind comprises, for example, a satellite data reception device for receiving, for example, data representing satellite television signals. A source node of this kind may of course also be any other device capable of receiving audiovisual signals and then introducing them into the home audiovisual network of the invention.

With a view to simplification, the rest of the document shall be limited to the case where the source node comprises a device for the reception of satellite television source signals. It will of course be easy for those skilled in the art to extend the following description to any type of source node.

Figure 2:
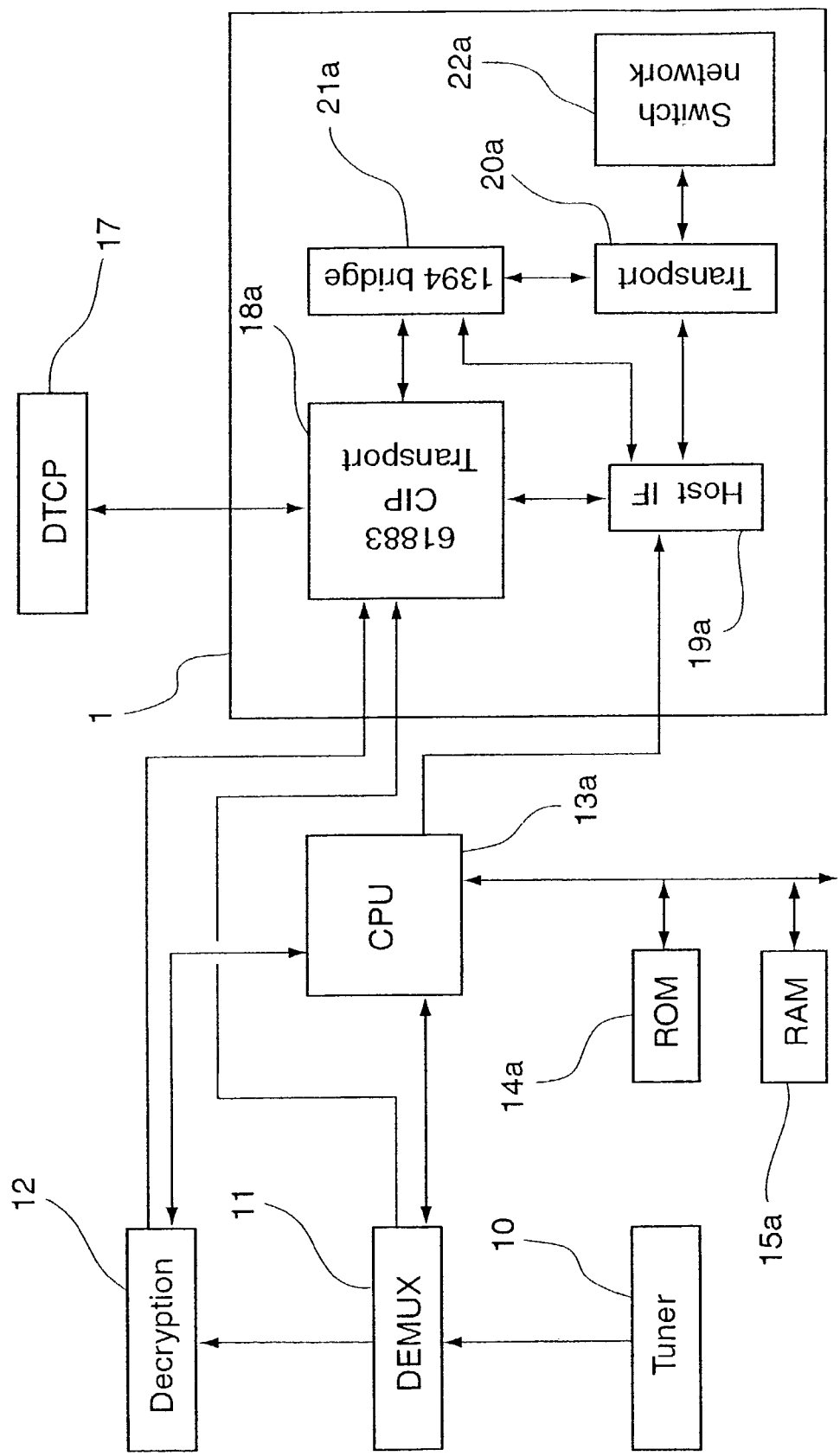
FIG. 2 illustrates the structure of a source node or tuner unit of the system of FIG. 1.

The source node of FIG. 2 can be subdivided into two distinct parts:

a first set of elements (not referenced in FIG. 2) sees to the processing of the source signals received from a source external to the network, such as the source signals received on a satellite antenna for example;

a second set of elements 1 is designed to ensure the functionalities of the source node within the switched audiovisual network to which it belongs.

The first set of elements comprises:

a tuner device 10 which, from the data received by a satellite antenna not shown in FIG. 2, extracts a channel multiplexing several audiovisual stations;

a demultiplexer 11 that demultiplexes the signals coming from the tuner 10, so as to select one of the audiovisual stations of the channel;

a decryption device 12 that decrypts the signals coming from the demultiplexer 11 so as to decrypt the audiovisual stations received in encrypted form by the source node;

a central processing unit (CPU) 13*a*;

a ROM (read-only memory) type permanent storage means 14*a*;

a RAM (random access memory) type of temporary storage means 15*a*;

an audiovisual signal encoding module 17 in the DTCP (digital transmission copy protection) format as defined in the "Digital Transmission Content Protection Specification, Volume 1 (Informational Version), Revision 1.1, Jul. 25, 2000", used for the application of a specific protective encoding to the audiovisual signals intended for a digital terminal. Only the digital terminals entitled to receive these audiovisual signals are equipped with a decoder having the corresponding DTCP format so that they can decode and then process the signal received.

The second set of elements 1 of the source node combines characteristic functional elements of technology implemented on the switched audiovisual network of the invention, and has at least two external input/output ports respectively connected to a serial communications bus designed to function according to the IEEE 1394 standard, and a switched network according to the IEEE 1355 standard.

It may be recalled that the IEEE 1394 standard is described in the following reference documents:

IEEE Std 1394-1995, Standard for High Performance Serial Bus;

IEEE Std 1394a-2000, Standard for High Performance Serial Bus.

"IEEE P1394.1 Draft 0.17 Standard for High Performance Serial Bus Bridges".

The IEEE 1355 standard for its part is defined by the IEEE 1355-1995 Standard for Heterogeneous InterConnect (HIC) (Low Cost Low Latency Scalable Serial Interconnect) (also known as ISO/IEC 14575 DIS).

The set 1 comprises especially:
- a block 18*a* for the conveyance of CIP (common isochronous packet) type packets according to the IEC 61883 standard as defined in the "International Standard Consumer Audio/Video Equipment—Digital Interface, First Edition, 1998-02, IEC 61883-1/2/3/4/5". A block 18*a* of this kind is supplied with data coming from the demultiplexer 11 and the decryption device 12 and delivers CIP type packets after having registered their time and date. Thus, the block 18*a* inserts a piece of absolute time information into the packets that it delivers, indicating when a packet has to be consumed by the application for which it is intended;
- a module 19*a* that provides the interface with the central processing unit for the blocks referenced 18*a*, 20*a* and 21*a*;
- a transportation module 20*a* made for example according to the FPGA technology used especially to insert a piece of information for the control of the broadcasting and/or copying in the packet intended to be transmitted by the source node to the switched audiovisual network of the invention;
- a device 21*a* known as a "1394 bridge" providing the interface, within the source node, with the total switched network formed by the system according to the invention, comprising IEEE 1355 links;
- a switching module 22*a* having an output port connected to the total switched network formed by the system according to the invention.

It will be noted that the source node has no 1394 interfacing means. This is designed to prevent a direct connection between the source node and a destination node.

Here below, referring to FIG. 3, we present an exemplary structure of a destination node (monitor unit), MU1 to MU8, belonging to a system according to the invention. It may be recalled that the term destination node is understood to mean the nodes included in the audiovisual networks R1, R2, R3 (apart from the access units describing detail here below with reference to FIG. 4).

The structure of a destination node of this kind is close to that of the source node described here above in that it comprises:
- a first set 2 of elements combining functional elements characteristic of the technology implemented in the total switched network formed by the system according to the invention. This first set of elements 2 has at least two input ports respectively connected to a serial communications bus designed to work according to the IEEE 1394 standard and a switched network according to the IEEE 1355 standard. Thus, a destination node can receive data packets either by one of the three input/output ports of the switch module 22*b* (packets coming through an IEEE 1355 link from the total switched network formed by the system according to the invention) or by one of the two input/output ports of the interfacing means 23*b* (packets coming through a 1394 serial communications bus from a terminal (data-processing device or peripheral) connected to this bus);
- a second set of elements (not referenced in FIG. 3) providing for the processing of the data packets coming from the total switched network formed by the system according to the invention, prior to their transfer to a terminal connected to the destination node. A terminal of this kind may be an analog or digital terminal.

Figure 3:
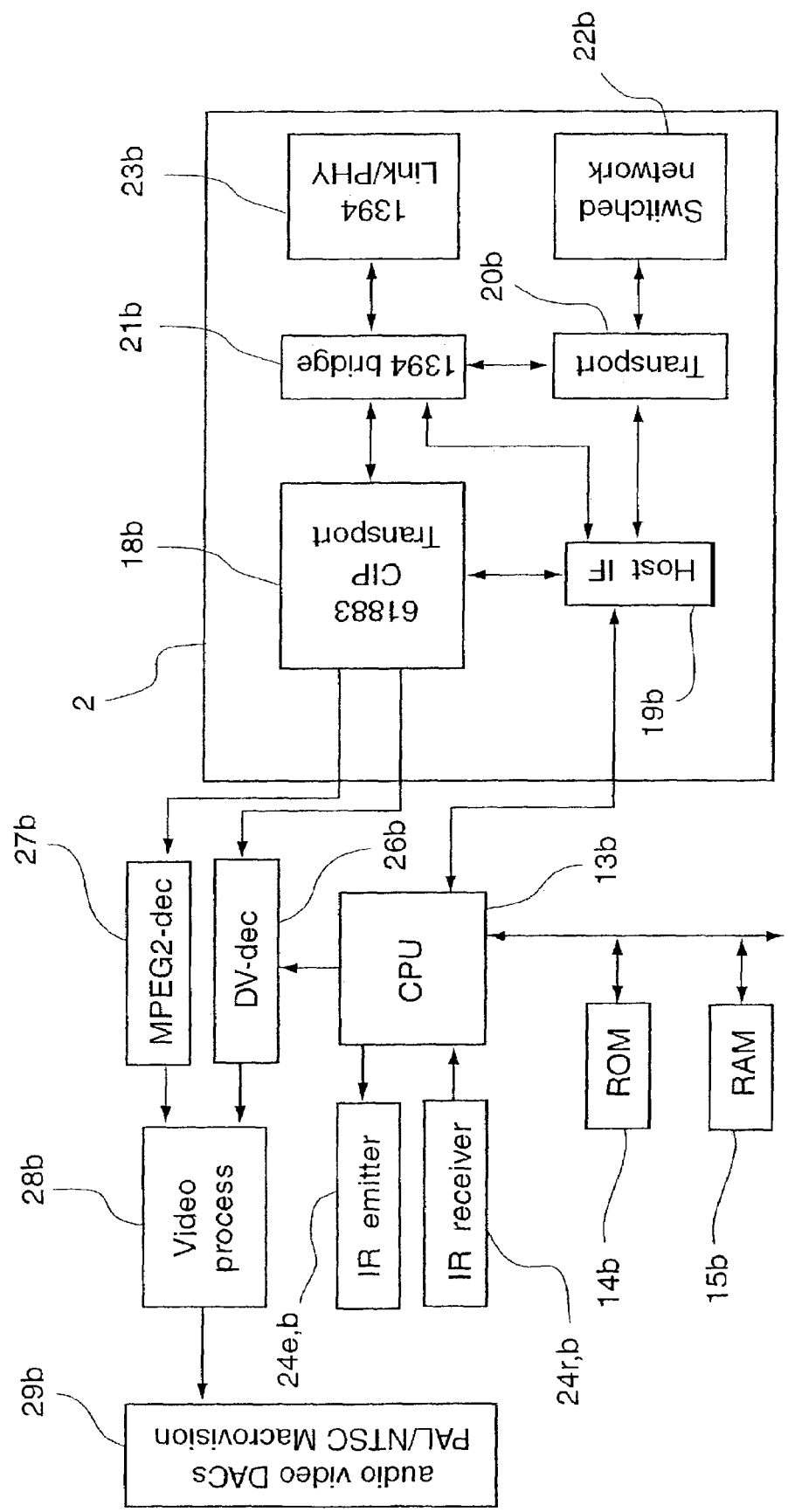
FIG. 3 illustrates the structure of a destination node or monitor unit of the system of FIG. 1.

The set 2 of FIG. 3 comprises elements similar to those of the set 1 of elements described with reference to FIG. 2, namely:
- a block 18*b* for the conveyance of CIP type packets according to the IEC 61883 standard;
- a module 19*b* that provides the interface with the central processing unit for the blocks referenced 18*b*, 20*b* and 21*b*;
- a transport module 20*b* providing for the processing of the above-mentioned control information;
- a device 21*b*, known as a "1394 bridge," providing the interface, within the source node, between the total audiovisual network formed by the system according to the invention (comprising IEEE 1355 links) and, secondly, a serial communications bus (designed to work according to the IEEE 1394 standard) to which the destination node is attached;
- a switching module 22*b* having three input/output ports connected to the total switched network formed by the system according to the invention;

The set 2 of FIG. 3 further comprises an interfacing means 23*b* comprising a set of PHY/LINK 1394 components. This means 23*b* is constituted, for example, by a TSB21LV03A PHY component and a TSB12LV01A LINK component which are commercially distributed by Texas Instruments (registered mark), and 1394 standard connectors, for example those marketed by the Company Molex (registered mark), for example under reference 53462. The interfacing means 23*b* include at least one external port designed to be connected to a terminal (data-processing device or peripheral) through a 1394 serial communications bus.

The elements of the destination node that process the data packets prior to their transfer to a terminal connected to the destination node comprise:
- a central processing unit or CPU 13*b*;
- a ROM type permanent storage means 14*b*;
- a RAM type temporary storage means 15*b*;
- an infrared reception device 24*r.b* providing for the reception of infrared signals sent for example by a remote control type device intended for the destination node and their transmission to the central processing unit 13*b*;
- an infrared transmission device 24*e.b* providing for the transmission of infrared signals intended for example for a terminal connected to the destination node so as to control this terminal;
- a DV (digital video) format decoder 26*b* according to the DV IEC 61834 standard described in the document "Specifications of consumer-use digital VCRs using 6.3 mm magnetic tape", published in December 1994, "HD Digital VCR Conference", providing for the decoding of audiovisual signals received by the destination node and encoded in the DV format;
- a decoder 27*b* in the MPEG2 (Moving Pictures Expert Group, according to the ISO/IEC 13818-1, 13818-2, 13818-3 standard) format used for the decoding of audiovisual signals received by the destination node and encoded in the MPEG2 format;
- a video-processing module 28*b*;
- a module 29*b* providing firstly for the digital/analog conversion of audiovisual signals intended for an analog destination terminal connected to the destination node and secondly the activation of anti-copy means according to the "Macrovision" system (designed and developed by the firm Macrovision, registered mark) when the contents of the audiovisual signals intended for an analog destination terminal of this kind have to be protected. The module 29b comprises one or more analog output ports to which it is possible to connect one or more analog terminals such as a television set or a video tape recorder for example. It may be recalled that the activation of the "Macrovision" system scrambles the analog signal coming from the analog output port of the module 29b imperceptibly for television type analog terminals, but prevents the copying of such a signal by an analog copying terminal such as a video tape recorder.

Figure 4:
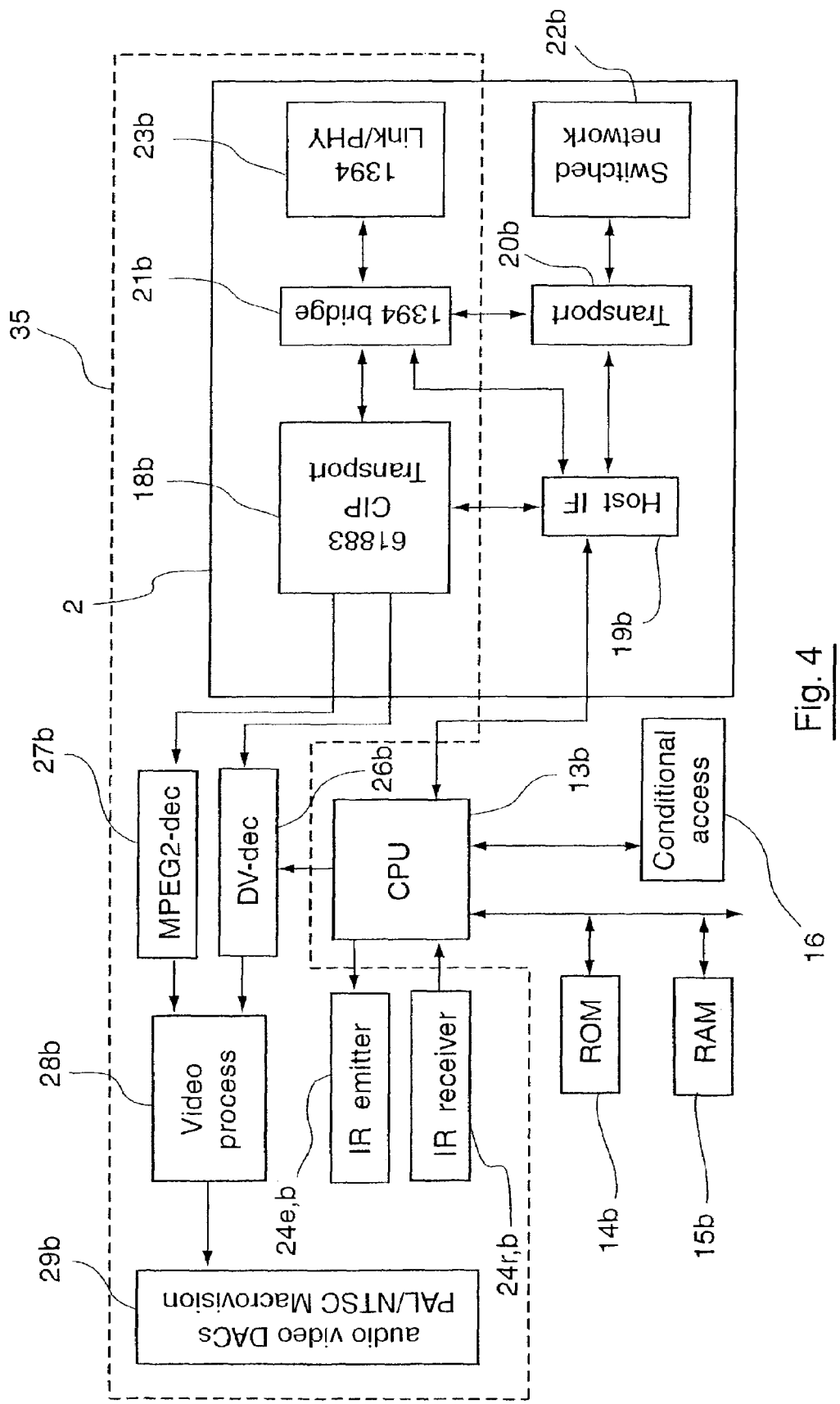
FIG. 4 illustrates the structure of an access unit of the system of FIG. 1.

It will be noted that, in this example, the destination node comprises no conditional access device (this aspect is managed by the access unit, cf. FIG. 4).

Referring to FIG. 4, we now present an exemplary structure of an access unit, AU1 to AU3, belonging to a system according to the invention.

In this example, the access unit furthermore forms a destination node. Its structure therefore differs from that of the destination node (cf. FIG. 3) solely in that it additionally comprises a conditional access device 16. Only this device 16 is therefore described now. It is a means of obtaining an access key on the basis of which the central switch authorizes the delivery of pay contents, by the source nodes, to destination nodes that ask for it.

Referring now to the above-mentioned first illustrative case, we shall present an exemplary operation of this mechanism of authorization by access key. The destination node or monitor unit MU1 of the first home audiovisual network R1 sends a connection request, for transmission of audiovisual signals by the tuner unit TU1. The access unit receives this connection request coming from the destination node. It retransmits it to the central switch CS, and has it accompanied, firstly, by the access key that it has obtained internally and, secondly, by an identifier of the destination node (monitor unit) MU1. The central switch CS receives and processes this request: if it determines that the access key is valid, it authorizes the requested connection (the identifier of the destination node MU1 is then used to define the corresponding routing path).

In an alternative mode of implementation of the access key authorization mechanism (cf. description of FIGS. 10 and 11), the destination node itself has means available for obtaining the access key. It may therefore attach this key to its connection request. The role of the access unit is then limited to that of a unique input/output point of the home audiovisual network to which it belongs, for all the other (destination) nodes of this network.

It must be noted that, in one alternative embodiment of the access unit, this node does not form a destination node and carries out only its basic function, namely the function of connecting a home audiovisual network with the central switch. In this case, it has no means to connect it with an analog terminal and no means to connect it with an IEEE 1394 type digital bus. In FIG. 4, the dashed box referenced 35 contains all the elements that are not necessary for the implementation of this minimalist variant.

Figure 5:
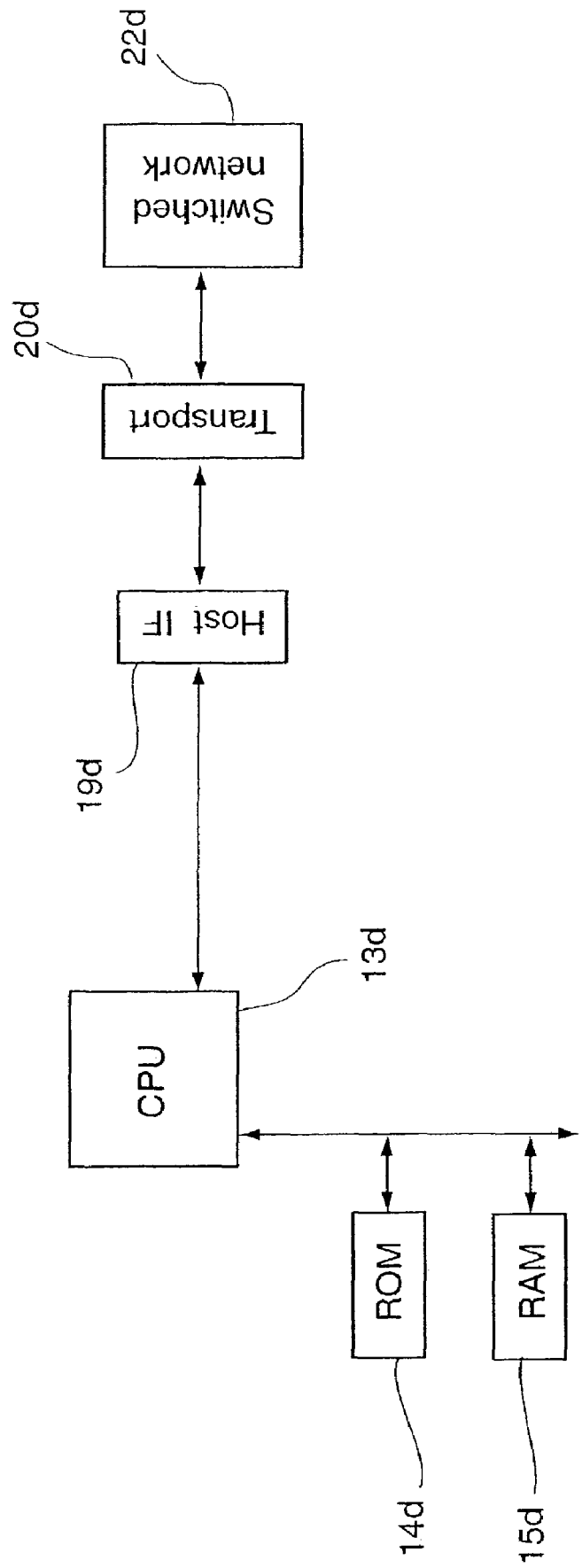
FIG. 5 illustrates the structure of a central switch of the system of FIG. 1.

Referring to FIG. 5, we shall now present an exemplary structure of a central switch CS belonging to a system according to the invention.

It has only means common to all the types of nodes described here above (source node, destination node and access node), namely means pertaining to the connection with the total switched network formed by the system according to the invention:

a central processing unit (or CPU) 13d;
   a ROM type permanent storage means 14d;
   a RAM type temporary storage means 15d;
   a module 19d forming the interface with the central processing unit for the bloc referenced 20d;
   a transportation module 20d;
   a switch module 22d having an output port connected to the total switched network formed by the system according to the invention.

The central switch contains no (analog or digital) interface means for the connection of a terminal or bus of the IEEE 1394 type. As explained in detail here below, it provides for a selective interconnection between the source nodes and the home audiovisual networks. Optionally, it can also be responsible for the detection of a junction (interconnection) that is unauthorized (namely does not pass through it) between two home audiovisual networks.

The switching architecture of the central switch CS enables it to fulfill specific functions not offered by the other types of nodes (source node, destination node and access node).

More specifically, this switching architecture comprises interconnection management means, themselves comprising:

means for the selective authorization of a first type of transmission of audiovisual signal, namely transmission through the central switch CS, from a tuner unit TU1, TU2 to (at least) one destination node MU1 to MU8 of one of the home audiovisual networks R1 to R3
   means for the systematic authorization of a second type of transmission of audiovisual signals, namely transmission, through the central switch CS, from an input node (see definition above) of one of the home audiovisual networks to (at least) one destination node of another of the home audiovisual networks;
   means for the systematic prohibition of a third type of transmission of audiovisual signals, namely transmission, through the central switch CS, from a destination node MU1 to MU8 of one of the home audiovisual networks to a tuner unit TU1, TU2.

The first illustrative case mentioned here above is an exemplary transmission of the first type (transmission, through the central switch CS, from the tuner unit TU1 to the destination node MU1).

The second illustrative case mentioned here above is an exemplary transmission of the second type (transmission, through the central switch CS, from the input node or monitor unit MU3 to the destination node or monitor unit MU1).

A description is now given of three embodiments of the interconnection management means offering the above-mentioned functions (selective authorization of the first type of transmission, systematic authorization of the second type of transmission and systematic prohibition of the third type of transmission).

In a first embodiment, the interconnection management means comprise two sets of input/output ports. One contains input/output ports dedicated to the connection of the tuner units TU1, TU2. The other contains input/output ports dedicated to the connection of the access units AU1 to AU3. In this case, a switching matrix of the central switch CS is predefined as a function of the pre-determined assignments of the input/output ports.

In a second embodiment, the interconnection management means comprise means for the management of an administration interface. This interface, whose program is executed by the central processing unit (CPU) 13d, enables an administrator of the system to define switching parameters within the central switch CS. In other words, the administrator defines the paths authorized inside the central switch CS, then programs the switching matrix of the central switch CS.

In a third embodiment, the interconnection management means comprise means for the dynamic identification of the access units AU1 to AU3 and the tuner units TU1, TU2 connected to the central switch CS. This dynamic identification is, for example, based on identifiers or keys specific to each of the access units and tuner units. The central switch CS asks for the identifiers of the nodes that are connected to it and automatically defines the switching matrix. Furthermore, in this case, if the central switch CS detects an unauthorized junction (or loop) between two home audiovisual networks, it may invalidate the data paths, in the switching matrix, from the source nodes to these home audiovisual networks. These paths will not be validated again until after the disappearance of the unauthorized loop.

FIG. 6 illustrates a topological map of the system of FIG. 1, forming a total switched network. The map is stored in the RAM of each node. It may be updated on each node, especially if the system is of the type enabling <<hot-plug>> connections. However, the synchronization of the topological map on the entire total switched network is not the object of the present invention.

In the example shown, the inputs of the topological table are node identifiers (CS, TU1 and TU2, AU1 to AU3, MU1 to MU8) and their corresponding output ports (P0 to P14). The outputs of the topological map are the neighboring nodes (namely the nodes connected to the output port of the considered node) and their associated ports. Thus, this topological table represents all the connections that exist in the total switched network formed by the system according to the invention.

For example, the port referenced 3 of central switch CS is connected to the port referenced 2 of the access unit AU3, and the port referenced 0 of the monitor unit MU4 is connected to the port referenced 1 of the monitor unit MU3.

The updating of the topological map may be based on exchanges of control data on the network, when a node detects a connection or disconnection of a link on one of its ports. Information on a table updating operation of this kind is given in Dimitri Bertsekas and Robert Gallager: "Data Networks", 2nd Edition, Prentice Hall International Inc, ISBN 0-13-201674-5 (see especially pp. 418 to 433).

Figure 7:
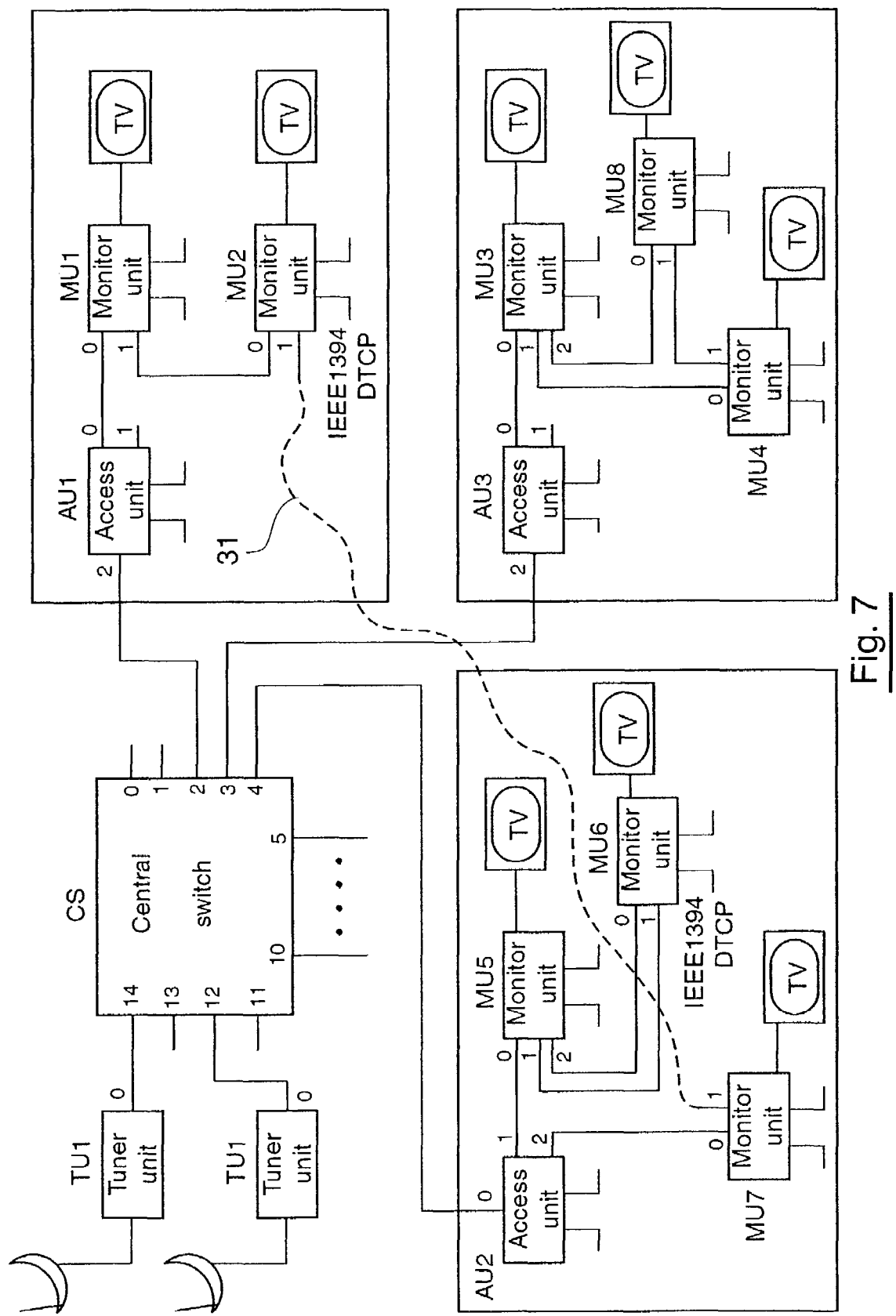
FIG. 7 illustrates a junction between home audiovisual networks added to the system of FIG. 1

FIG. 7 is an illustration which refers again to the system of FIG. 1 to illustrate a junction (also called a loop) between two home audiovisual networks. In this example, a link 31 has been added between the port 1 of the destination node MU2 of the first premier home audiovisual network R1, and the port 1 of the destination node MU7 of the second home audiovisual network R2. FIG. 8 illustrates a topological map of the system thus modified.

Figure 9:
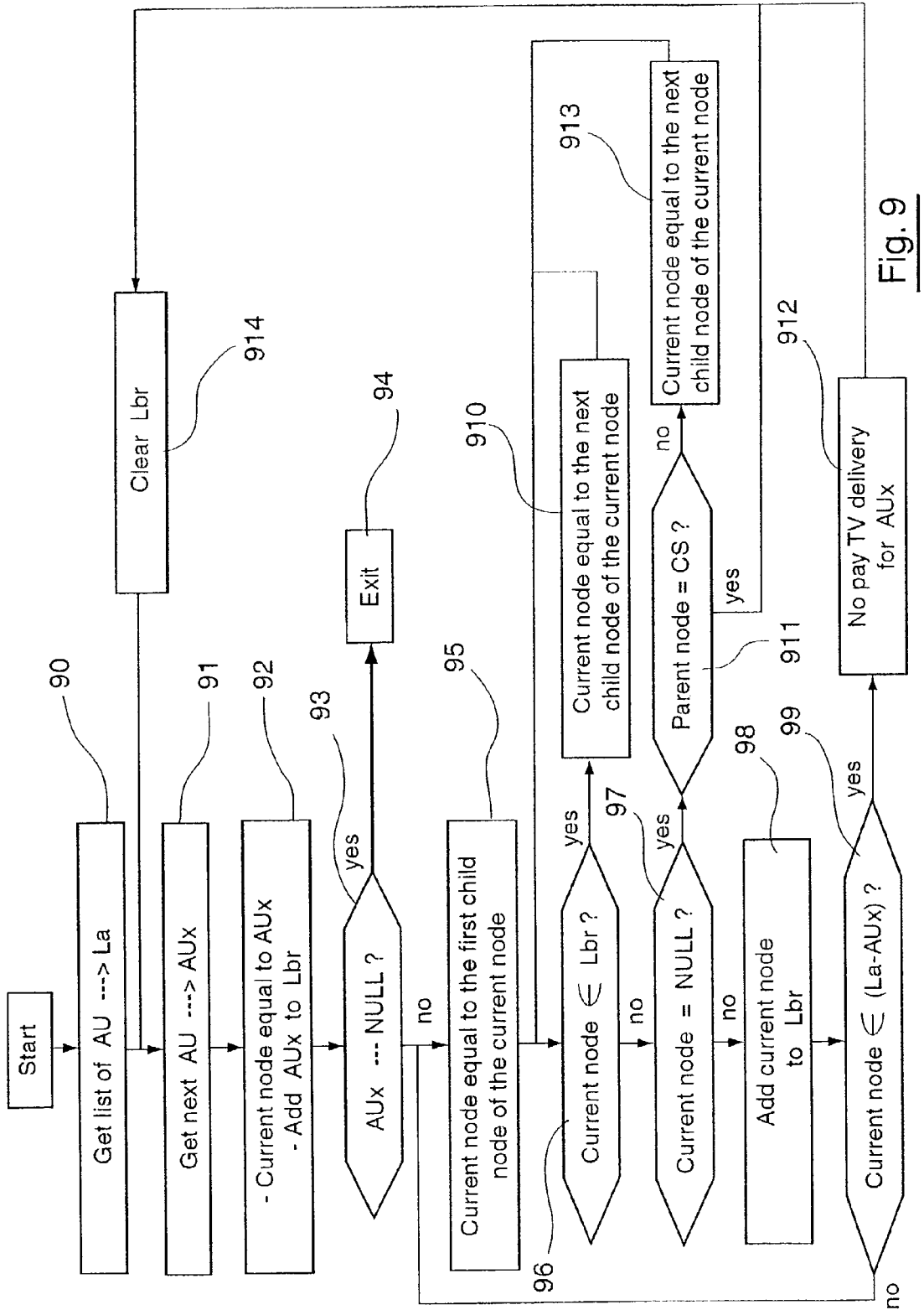
FIG. 9 is a flowchart describing an algorithm for the detection of an inter-network junction as illustrated in FIG. 7

Referring to FIG. 9, we shall now present a flowchart describing an exemplary algorithm for the detection of a junction between networks, as illustrated in FIG. 7.

This algorithm is stored in the ROM 14*d* of the central switch CS. It is loaded into the RAM 15 after a change in topology has been detected, and the central processing unit (CPU) 13*d* will execute the instructions corresponding to this algorithm. All the information needed for the working of this algorithm is contained in the topological map (cf. FIG. 8).

It must be noted that if the system comprises several central switches, the algorithm can be executed by all the central switches. In this case, when they obtain the list of access units, they take account of all the access units connected to any central switch.

We shall now present, first of all, the total functioning of this algorithm. The list of access units AU, connected to the central switch, that constitute the points of access to the home audiovisual networks is obtained. Then, the branch of the total switched network (formed by the system of the invention) located "downstream" from each access unit is scanned. It is assumed arbitrarily that the central switch is located upstream from each access unit. In other words, for each given access unit, the list of all the nodes that can be reached through this given access unit is obtained. If this branch contains another access unit, it means that there is a cable (junction) between the two home audiovisual networks to which the given access unit and this other access unit belong. The central switch then prohibits the delivery of pay-contents to these two home audiovisual networks. This means that the transmissions in progress, of the first type mentioned here above, are interrupted if they implicate nodes of these two home audiovisual networks. No new transmissions of the first type mentioned here above are authorized so long as the junction is present. We shall now describe the detailed operation of the algorithm illustrated in FIG. 9. The following abbreviations and variables are used:

AU: accès unit;

La: list of access units

AUx: access unit of home audiovisual network under analysis;

Lbr: list of nodes of the branch ("beneath" the access unit) under analysis;

CS: central switch

Current Node: pointer on node under analysis (may be zero "Null")

Step 90: obtaining the list (La) of access units

Step 91: obtaining of the next element (AUx) of the list (La) of access units.

Step 92: Current Node becomes this element (AUx), this element being furthermore added to the list (Lbr) of nodes of the branch under analysis.

Step 93: if the element (AUx) is zero (namely if there are no longer any access units to be analyzed, there is an exit from the algorithm (step 94), else passage to the step 95.

Step 95: Current Node points to the first child node (the one connected to the port #0, if any) connected to the node previously pointed to by the Current Node. For example, if Current Node has pointed to the access unit AU1 during the step 92, it henceforth points to the destination node MU1.

Step 96: verification that Current Node belongs to the list (Lbr) of the nodes of the branch under analysis. If the answer is affirmative, it means that the node pointed to has already been analyzed and the operation passes to the step 910. If not, the next step is the step 97.

Step 97: if Current Node is zero (namely there is no other node connected to the parent node), the next step is the step 911. If not, the next step is the step 98.

Step 98: addition of the node pointed to by Current Node in the list (Lbr) of the nodes of the branch being analyzed.

Step 99: if Current Node belongs to the list (La) of the access units (except for the access unit (AUx) of the home audiovisual network under analysis) it means that there is a junction (2) between two home audiovisual networks (two different access units are present in the same branch); hence the delivery of pay-contents is not authorized for the home audiovisual network to which the access unit AUx belongs (step 912). If not, the next step is the step 95.

Step 910: Current Node points to the next child node of the parent node (if there is no longer any connected node, Current Node becomes zero and the parent node becomes the parent node of the current parent node), and the next step is the step 96. For example, if Current Node points to the destination node MU5, the parent node is AU2, and the next child node of the parent node is the destination node MU7.

Step 911: a check is made to ascertain that the parent node is the central switch (CS). If the answer is affirmative, there is a return, through the step 914, to the step 91 (the entire home audiovisual network to which the current access unit AUx belongs has been scanned ). If not, the next step is the step 913 (there are nodes connected to ports that have not yet been analyzed)

Step 913: (identical to the step 910).

Step 914: the list (Lbr) of the nodes of the branch under analysis is erased. The next step is the step 91.

Figure 11:
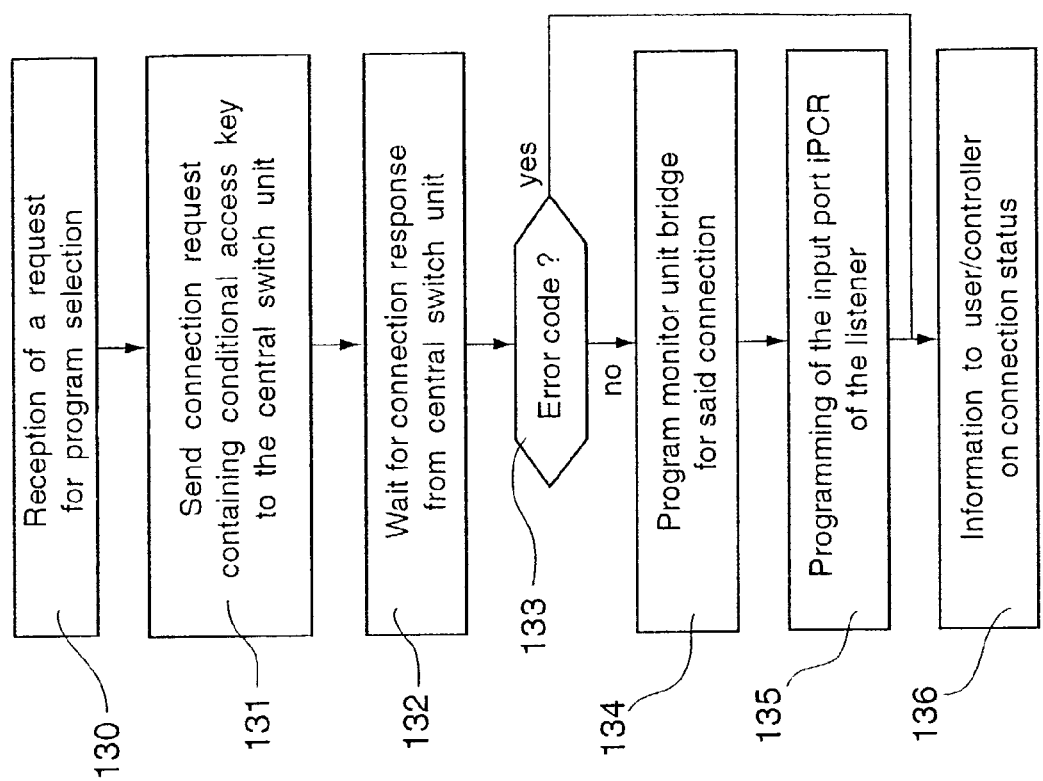
FIGS. 10 and 11 are two flowcharts each describing an algorithm relating to the delivery of "pay contents", one (cf.
Figure 10:
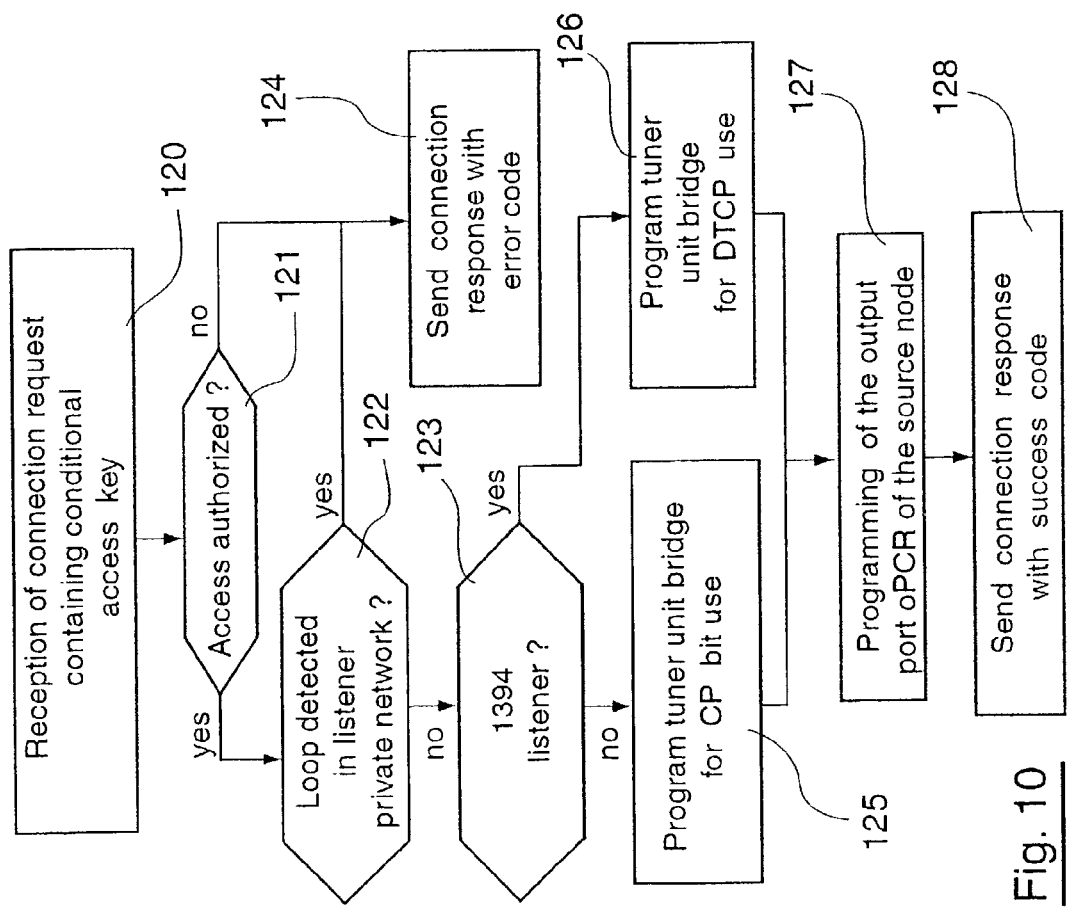

Referring now to the flowcharts of FIGS. 10 and 11, two exemplary algorithms are presented. These algorithms are executed by the central switch (cf. FIG. 10) and by the destination node (cf. FIG. 11) respectively in order to enable the setting up of a transmission of the above-mentioned type (delivery of pay-contents to a destination node by a source node, through a central switch).

The algorithm illustrated in FIG. 11 is stored in the ROM 14b of the destination node. It is loaded into the RAM 15b when the system is powered on and the central processing unit (CPU) 13b will execute the instructions corresponding to this algorithm.

The destination node receives a program selection request (for example by the reception of infrared signals or again by a message from a controller) (step 130). It then sends a connection request containing a conditional access key to the central switch (step 131). Then it waits for a connection response from the central switch (step 132). If it receives a response with a success code (response "no" at the step 133), it programs its "1394 bridge" 21b for this connection (step 134), then the input port iPCR of the destination terminal or listener (step 135). Finally, it informs the user/controller about the connection state (step 136). If it receives a response with an error code ("yes" response at the step 133), it goes directly to the step 136 discussed here above.

The algorithm illustrated in FIG. 10 is stored in the ROM 14d of the central switch CS. It is loaded into the RAM 15d when the system is powered on and the central processing unit (CPU) 13d will execute the instructions corresponding to this algorithm.

The central switch receives the connection request containing the conditional access key, sent by the destination node (step 120). It verifies the access key so as to ascertain that the requested connection is authorized (step 101). If the access is not authorized (response "no" at the step 121), it sends a connection response with an error code (step 124). If the access is authorized (response "yes" at the step 121), it tries to detect a possible loop in the network of the destination node (namely a junction with another home audiovisual network) (step 122). If the loop is detected (response "yes" at the step 122), it sends a connection response within error code (step 124). If no loop is detected (response "no" at the step 122), it detects the nature (namely the digital or analog nature) of the destination terminal (step 123). If the listener terminal is a digital device (1394 type), the central switch programs the "1394 Bridge" 21a of the source node, in order to apply a DTCP type encoding (step 126). If the destination terminal is an analog device, the central switch programs the "1394 Bridge" 21a of the source node in order to use a protection bit CP (step 126). At the end of any one of the steps 125 and 126, it programs the output port oPCR of the source node (step 127). Finally it sends a connection response with a success code (step 128).

Referring now to the flow charts of FIGS. 12 and 13, two exemplary algorithms are presented. These algorithms are executed by the central switch (cf. FIG. 12) and by the destination node (cf. FIG. 13) respectively in order to enable the setting up of a direct transmission from one home audiovisual network to another (for example from R2 to R1).

We shall therefore discuss here the delivery of user contents to a destination node by an input node, without going through a central switch. The transmission is done for example on a junction added between the two home audiovisual networks concerned. Reference shall be made to the above discussion pertaining to a junction of this kind (cf. FIGS. 7 and 8), as well as to its detection by the central switch (cf. FIG. 9) in order to prevent it from conveying pay-contents in addition to the user-contents. It is clear, however, that the present invention also covers the case where the exchange of user contents between two nodes of two different home audiovisual networks is done by means of a central switch. In this case (pertaining to the second type of transmission mentioned here above), it will be recalled that the central switch systematically permits the requested transmission of audiovisual signals.

Furthermore, in the following example, a mechanism is provided for verifying the access key in order to secure the exchange of user contents between two nodes of two different home audiovisual networks. It will be noted that this mechanism is optional.

The algorithm illustrated in FIG. 13 is stored in the ROM of the destination node. It is loaded into the RAM when the power is turned on, and the central processing unit (CPU) will execute the instructions corresponding to this algorithm.

The destination node, which belongs to the first home audiovisual network R1, receives a program selection request (for example by the reception of infrared signals, or again a message from a controller) (step 150). It then sends a connection request containing a conditional access key to the input node, which belongs to the second home audiovisual network R2 (step 151). Then it waits for a connection response from the input node (step 152). If it receives a response with a success code (response "no" at the step 153), it programs its "1394 bridge" for this connection (step 154), then the input port iPCR of the destination terminal or listener (step 155). Finally, it informs the user/controller about the connection state (step 156). If it receives a response with an error code ("yes" response at the step 153), it goes directly to the step 156 discussed here above.

The algorithm illustrated in FIG. 12 is stored in the ROM of the input node. It is loaded into the RAM when the system is powered on and the central processing unit (CPU) will execute the instructions corresponding to this algorithm.

The input node, which belongs to the home audiovisual network, receives the connection request containing the conditional access key, sent by the destination node, which belongs to the first home audiovisual network R1 (step 140). It verifies the access key so as to ascertain that the requested connection is authorized (step 141). If the access is not authorized (response "no" at the step 141), it sends a connection response with an error code (step 142). If the access is authorized (response "yes" at the step 141), it programs its "1394 Bridge" (step 143). Then it programs the output port oPCR of the input terminal (step 144). Finally it sends a connection response with a success code (step 145).

Optionally, the present invention furthermore includes a mechanism to control the copying and/or broadcasting of audiovisual signals by the destination nodes. This mechanism is described here below with reference to FIGS. 14 to 16.

Hereinafter in the description, it is assumed that, on the source node side, this control mechanism is implemented by the central switch. It is clear however that the invention also relates to the case where the control mechanism is implemented by the source node itself or again where it is implemented partially by the source node and partially by the central switch.

It is assumed hereinafeter in the description that the audiovisual signals are conveyed in packets, from one node (source or input node) to another node (destination node). Thus, in the first illustrative case described here above, the packets convey for example MPEG2 format audiovisual signals from the source node to the destination node. In the second above-mentioned illustrative case, the packets convey for example DV format audiovisual signals from the input node to the destination node.

It is assumed hereinafter in the description that each packet has the particular structure illustrated in FIG. 1 comprising a header 51 and a data field (also called contents) 52.

The header 51 comprises:
  fields referenced 53 to 56 pertaining to the routing of the packet. The present invention is not concerned with them and shall not be described in greater:
  a "source_node_id" field 57 containing an identifier of the source node;
  a "CP" field 58 containing, in a manner specific to the present invention, a piece of information to control the copying and/or broadcasting of the audiovisual signal conveyed by the data field 52 of the packet;
  a "cv" field 59 containing a virtual channel identifier used to distinguish between different streams coming from one and the same source node (and hence to identify the destination terminal when several terminals connected to one and the same destination node receive audiovisual signals coming from one and the same source node).

As explained in detail hereinafter, the source node fills the field CP, i.e. it gives a value to the piece of control information as a function of the nature (analog or digital) of the destination terminal, the level of protection to be applied to the audiovisual signal and broadcasting criteria, if any, to be applied.

The control information is for example encoded in the field CP on two bits: a first bit, called a protection bit, and a second bit called a broadcasting bit. The criteria by which the source node assigns the value 0 or 1 to each of these two bits, as well as the use by the destination node of these two bits, are described in detail here below in the description.

Figure 16:
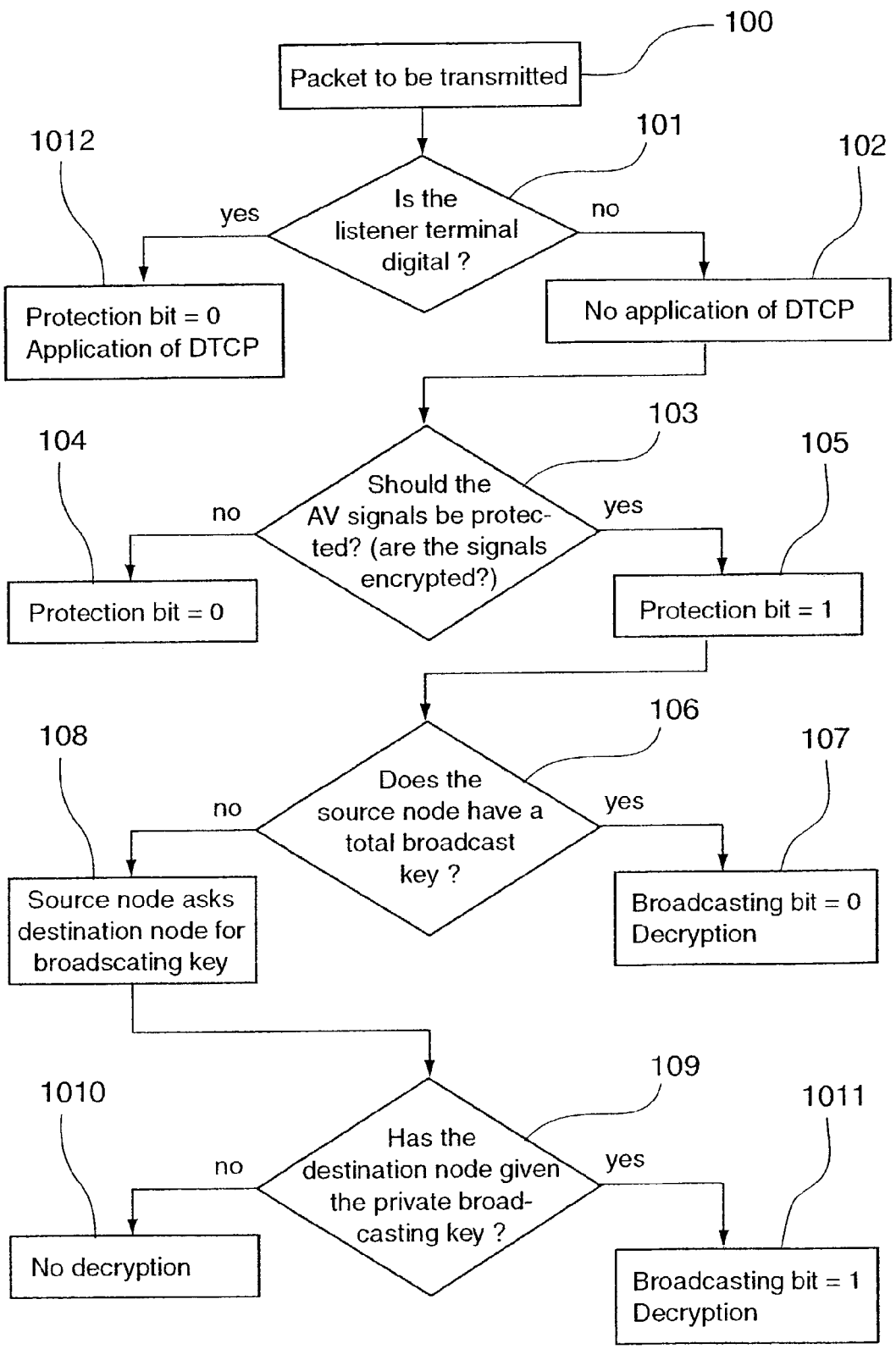
FIG. 16 is a flowchart describing an algorithm for the processing of a packet, in a particular embodiment of the invention, in a central switch of the system of FIG. 1.

Referring to the flow chart of FIG. 16, we shall now describe an exemplary algorithm for the processing of a packet in the central switch.

This algorithm is stored in the ROM of the central switch. It is loaded in the RAM when the system is powered on, and the central processing unit (CPU) will execute the instructions corresponding to this algorithm.

Before authorizing or not authorizing the dispatch of a packet (step 100), the central switch detects the nature of the listener (television set in the first and second illustrative cases mentioned here above) (step 101 corresponding to the step 123 of FIG. 10 discussed here above).

If the destination terminal ("listener") is a digital terminal, the central switch assigns the value "0" to the protection bit of the field CP and applies a DTCP type encoding (step 1012).

If the destination terminal ("listener") is not a digital terminal (i.e. if it is an analog terminal), the central switch does not apply the DTCP type encoding (step 102). It finds out whether the audiovisual signals have to be protected (namely for example if the source signals are encrypted and do not have to be encrypted except under certain conditions) (step 103). If the audiovisual signals do not have to be protected, the central switch assigns the value "0" to the protection bit of the field CP (step 104). If the audiovisual signals have to be protected, the central switch assigns the value "1" to the protection bit of the field CP (step 105).

Then the central switch finds out if it has a total broadcasting key (step 106). If it does, it assigns the value "0" to the broadcasting bit of the field CP and carries out a decryption (step 107). If not, the central switch requests the destination node for a private broadcasting key (also called a local broadcasting key) (step 108). If the destination node gives the private broadcasting key (response "yes" to the step referenced 109), the central switch assigns the value "1" to the broadcasting bit of the field CP and carries out a decryption (step 1011). If the destination node does not give the private broadcasting key (response "no" to the step referenced 109), the central switch does not perform any decryption (step 1010).

Figure 14:
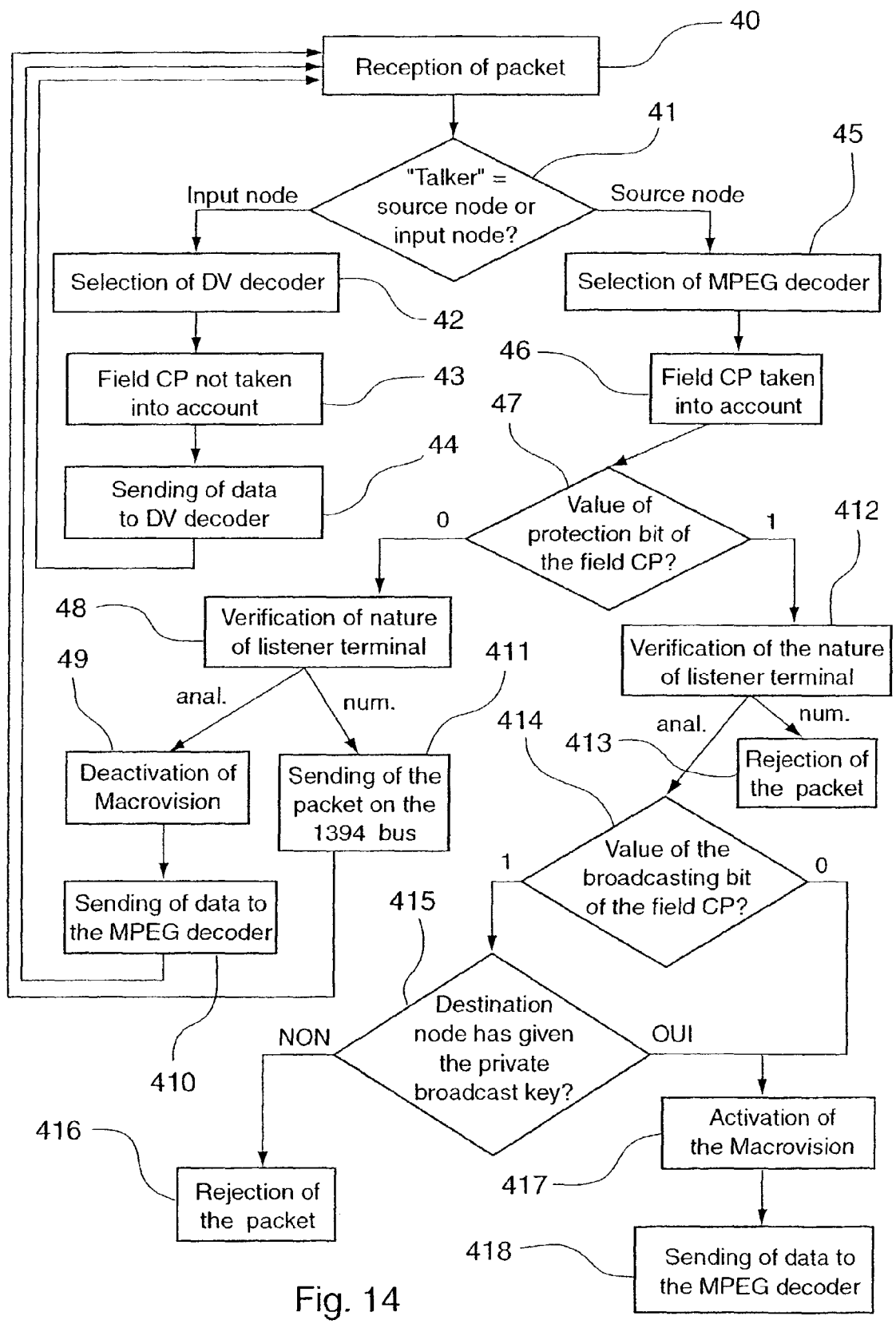
FIG. 14 is a flowchart describing an algorithm for the processing of a packet, in a particular embodiment of the invention, in a destination node of the system of FIG. 1.
Figure 15:
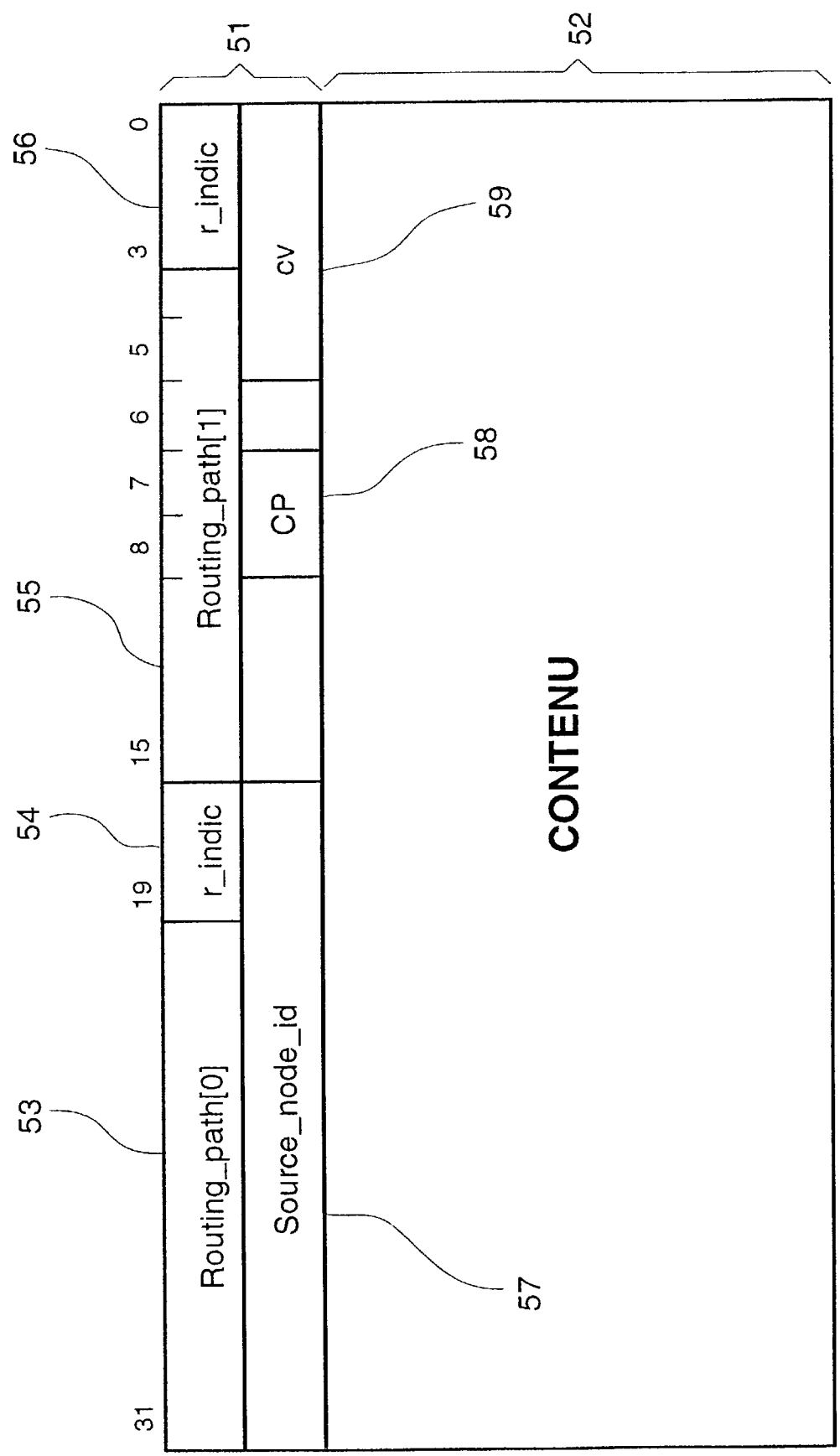
FIG. 15 illustrates the structure of an exemplary packet according to the invention, conveying an audiovisual signal between a source node and a destination node of the system of FIG. 1.

Referring now to the flow chart of FIG. 14, we shall now describe an exemplary algorithm for the processing of a packet in a destination node.

This algorithm is stored in the ROM associated with the transport module. When the power is turned on, the transport module loads and executes the instructions corresponding to this algorithm.

After reception of a packet (step 40), the destination node finds out whether the transmitter device ("talker") is a source node or an input node (step 41).

If the transmitter device ("talker") is an input node (i.e. the second case illustrated here above), the destination node selects its DV decoder (step 42). The field CP is not taken into account (step 43). The data of the data field 52 of the packet are sent to the DV decoder (step 44).

If the transmitter equipment ("talker") is a source 3 (first illustrative case mentioned here above), the destination node selects its MPEG decoder (step 45). The field CP is taken into account (step 46). The destination node analyzes the value of the protection bit of the field CP (step 47).

If the protection bit of the field CP takes the value "0", the destination node verifies the nature of the destination terminal or listener (television set ("listener") in the first and second cases illustrated here above) (step 48). If it is an analog terminal, the destination node deactivates the "Macrovision" (step 49) and sends the data from the data field 52 of the packet to the MPEG decoder (step 410). If it is a digital terminal, the packet is sent on the IEEE 1394 bus to which the digital terminal (step 411) is connected.

If the protection bit of the field CP assumes the value "1", the destination node verifies the nature of the destination terminal or listener (step 412). If it is a digital terminal, the destination node rejects the packet (step 413). If it is an analog terminal, the destination node analyzes the value of the broadcasting bit of the field CP (step 414).

If the broadcasting bit of the field CP takes the value "1", the destination node ascertains that it is the one which has preliminarily given the private key (step 415). If the answer is negative, the destination node rejects the packet (step 416). If the answer is affirmative, the destination node activates the "Macrovision" (step 417) and sends the data from the data field 52 of the packet to the MPEG decoder (step 418).

If the broadcasting bit of the field CP takes the value "0", the steps 417 and 418 discussed here above are performed directly.

What is claimed is:

1. A system for the transmission of signals between at least one source node and at least one destination node, the system comprising:

a central switch, connected to a source node;

a plurality of home networks, including a first home network comprising a destination node, each home network being connected to the central switch via at least an access node, wherein the central switch comprises an interconnection management unit for managing the exchange of signals, the interconnection management unit comprising a selective authorization unit for selectively authorizing the transmission of signals from the source node to the destination node through the central switch and the access node, wherein the central switch comprises a detection unit for detecting a direct junction between two networks of the plurality of home networks, which does not go through the central switch, and wherein the selective authorization unit prohibits the transmission of signals through the central switch from a source node to a destination node included in one of the home networks involved in the direct junction.

2. The system according to claim 1, wherein the interconnection management unit comprises a prohibition unit for systematically prohibiting the transmission of signals from any node of the home networks to a source node, through the central switch.

3. The system according to claim 1, wherein each home network comprises a single access node via which it is connected to the central switch.

4. The system according to claim 1, wherein each destination node comprises:

an obtaining unit for obtaining an access key; and a transmission unit for transmitting a connection request to the interconnection management unit, for the reception of signals from a source node, the connection request containing the access key.

5. The system according to claim 1, wherein each destination node comprises:

a transmission unit for transmitting a connection request to the access node, for the reception of signals from a source node, and wherein the access node comprises:

(a) a reception unit for receiving a connection request from a destination node;

(b) an obtaining unit for obtaining an access key; and (c) a transmission unit for transmitting the connection request to the interconnection management unit, the connection request containing the access key and an identifier of the destination node.

6. The system according to claim 1, wherein the interconnection management unit comprises:

a reception unit for receiving a connection request for the transmission of signals from a source node to a destination node, the connection request containing at least an access key; and a checking unit for checking the access key contained in the connection request, wherein the selective authorization unit authorizes the transmission of signals from the source node to the destination node according to the access key.

7. The system according to claim 1, wherein the interconnection management unit comprises an automatic authorization unit for automatically authorizing the transmission of signals from an input node of a second home network to a destination node of a third home network, through the central switch.

8. The system according to claim 1, wherein each central switch comprises a first set of input/output ports for connecting source nodes and a second set of input/output port for connecting access nodes.

9. The system according to claim 8, wherein the interconnection management unit comprises an administration interface manager, through which a system administrator can allocate switching parameters, which define authorized paths between the first and second set of ports of the central switch.

10. The system according to claim 8, wherein the interconnection management unit comprises an identification unit for dynamically identifying the nodes connected to the central switch and an allocating unit for automatically defining the switching parameters of the central switch.

11. The system according to claim 1, wherein the home network is a switched type network.

12. The system according to claim 1, wherein the source node and or the central switch comprises an insertion unit for inserting, into a signal to be sent from the source node to the destination node, control information for the control, by the destination node, of the copying and/or broadcasting of the signal.

13. The system according to claim 12, wherein the control information comprises a first information element for specifying whether the destination node is or is not allowed to authorize a destination terminal, connected to the destination node, to copy the signals.

14. The system according on claim 13, wherein the first information element is encoded in one bit.

15. A system according to any of the claims 13 or 14, wherein a monitor unit is associated with a destination node and an anti-copying unit of the monitor unit is activated or deactivated, depending on a value of the first information element, and wherein, when activated, the anti-copying unit acts on the signal to enable the signal to be viewed but not recorded.

16. The system according to claim 15, wherein the anti-copying unit performs a scrambling operation according to a Macrovision standard.

17. The system according to claim 12, wherein the control information further comprises a second information element specifying whether the signal is intended for a particular destination terminal, connected to the destination node, and/or for a particular user, or whether the signal is authorized to be transmitted to any other destination terminal connected to the destination node.

18. The system according on claim 17, wherein the second information element is encoded in one bit.

19. The system according to claim 17, wherein, the destination node comprises a control unit for controlling, when the second information element specifies that the signal is intended for the particular destination terminal, a connection to the destination node.

20. The system according to claim 19, wherein the control unit comprises a detection unit for detecting a local key, known to the destination node and/or introduced by the particular user.

21. The signal transmitted from a source node to a destination node through at least one central switch of a system according to claim 1, wherein the signal comprises control information for the control by the destination node of the copying and/or broadcasting of the signal.

22. central switch for connection to a source node, and to a plurality of home networks, the plurality of networks including a first home network comprising a destination node, each home network being connectable to the central switch via at least an access node, the central switch comprising:

an interconnection management unit for managing the exchange of signals, the interconnection management unit comprising a selective authorization unit for selectively authorizing the transmission of signals from the source node to the destination node through the central switch and the access node; and a detection unit for detecting a direct junction between two networks of the plurality of home networks, which does not go through the central switch, wherein the selective authorization unit prohibits the transmission of signals through the central switch from a source node to a destination node in one of the home networks involved in a direct junction.

23. A control method for transmission of signals between at least one source node and at least one destination node in a system comprising a central switch connected to a source node, and a plurality of home networks, the plurality of home networks including a first home network comprising a destination node, each home network being connected to the central switch by at least an access node, the method comprising:

managing the exchange of signals by selectively authorizing transmission of signals from the source node to the destination node through the central switch and the access node;

detecting a direct junction between two networks of the plurality of home networks, which does not go through the central switch; and prohibiting the transmission of signals through the central switch from a source node to a destination node included in one of the home networks involved in the direct junction.

* * * * *